(12) United States Patent
Kumar et al.

(10) Patent No.: US 7,606,865 B2
(45) Date of Patent: Oct. 20, 2009

(54) COLLABORATION SYSTEM AND METHOD

(75) Inventors: Ankesh Kumar, San Mateo, CA (US); Martin Logan, San Francisco, CA (US)

(73) Assignee: Grouptivity, San Mateo, CA (US)

( * ) Notice: Subject to any disclaimer, the term of this patent is extended or adjusted under 35 U.S.C. 154(b) by 59 days.

(21) Appl. No.: 11/939,516

(22) Filed: Nov. 13, 2007

(65) Prior Publication Data

US 2008/0147810 A1 Jun. 19, 2008

Related U.S. Application Data

(63) Continuation-in-part of application No. 11/028,691, filed on Jan. 4, 2005, now abandoned, and a continuation of application No. 10/862,727, filed on Jun. 7, 2004, now abandoned, each which is a continuation of application No. 10/307,188, filed on Nov. 29, 2002, now Pat. No. 7,219,130.

(60) Provisional application No. 60/858,798, filed on Nov. 14, 2006, provisional application No. 60/953,107, filed on Jul. 31, 2007.

(51) Int. Cl.
*G06F 15/16* (2006.01)
(52) U.S. Cl. ............ 709/206; 709/203; 709/217; 709/223
(58) Field of Classification Search ........ 709/206, 709/205, 203, 217, 219, 223, 224
See application file for complete search history.

(56) References Cited

U.S. PATENT DOCUMENTS

| | | | | |
|---|---|---|---|---|
| 6,496,849 | B1 * | 12/2002 | Hanson et al. | 709/200 |
| 6,704,772 | B1 * | 3/2004 | Ahmed et al. | 709/207 |
| 7,222,156 | B2 * | 5/2007 | Gupta et al. | 709/206 |
| 7,516,186 | B1 * | 4/2009 | Borghetti et al. | 709/206 |
| 2002/0016788 | A1 * | 2/2002 | Burridge | 707/10 |
| 2002/0062368 | A1 * | 5/2002 | Holtzman et al. | 709/224 |
| 2002/0138582 | A1 | 9/2002 | Chandra et al. | |
| 2004/0172450 | A1 * | 9/2004 | Edelstein et al. | 709/205 |
| 2005/0160145 | A1 * | 7/2005 | Gruen et al. | 709/206 |
| 2005/0266388 | A1 * | 12/2005 | Gross et al. | 434/350 |
| 2006/0053194 | A1 | 3/2006 | Schneider et al. | |
| 2006/0174340 | A1 * | 8/2006 | Santos et al. | 726/21 |
| 2007/0061425 | A1 * | 3/2007 | Yamamoto et al. | 709/219 |
| 2008/0228774 | A1 * | 9/2008 | Hamilton et al. | 707/10 |

OTHER PUBLICATIONS

PCT/US 07/23818, International Search Report, Jun. 5, 2008.
PCT/US 07/23818, Written Opinion, Jun. 5, 2008.

* cited by examiner

*Primary Examiner*—Lashonda T Jacobs
(74) *Attorney, Agent, or Firm*—Jonathan A. Small

(57) ABSTRACT

A collaboration system and method are provided. In the collaboration system, a collaborative web service is provided that mimics the simplicity of email and the collaboration system can be integrated into other databases.

26 Claims, 47 Drawing Sheets

ADDITIONAL OPTIONS
GROUP LIST SETTINGS
I WOULD LIKE THE GROUP TO SEE ANSWERS TO ALL THE QUESTIONS
I WOULD LIKE TO SHOW THE GROUP LIST SO EVERYONE IN THE GROUP CAN SEE IT
WOULD YOU LIKE TO CREATE A DISCUSSION BOARD FRO THIS TOPIC? (RECOMMENDED)
○ YES ○ NO
IS IT OKAY IF YOUR GROUP INVITES OTHER PEOPLE TO SOCIAL MAIL AND DISCUSSION BOARD?
○ YES ○ NO

ATTACHMENTS
MAXIMUM OF 3 ATTACHMENTS WITH EACH NOT EXCEEDING 1 MB
[ BROWSE... ]
[ ATTACH ]

[ SEND ] [ SAVE AS DRAFT ] [ PREVIEW ] [ CANCEL ]

COLLABORATION SYSTEM AND METHOD

PRIORITY CLAIMS

This application claims priority under 35 USC 119(e) to: 1) U.S. Provisional Patent Application Ser. No. 60/858,798, filed on Nov. 14, 2006 and entitled "Collaboration System and Method" which is incorporated herein by reference; and 2) U.S. Provisional Patent Application Ser. No. 60/953,107, filed on Jul. 31, 2007 and entitled "Collaboration System and Method" which is incorporated herein by reference. This application also claims priority under 35 USC 120 and is a continuation in part of U.S. patent application Ser. Nos. 11/028,691 and 10/862,727 filed on Jan. 4, 2005 and Jun. 7, 2004 respectively which are in turn continuation in parts of U.S. Pat. No. 7,219,130, all of which are incorporated herein by reference.

FIELD

The field relates to a collaboration system and method and in particular to web services based collaboration system and method.

BACKGROUND

On the web there are a number of tools that help gather (RSS), distribute (email/send to a friend), share documents, and discuss in a public discussion forum, to exchange information with others. This is pervasive across the web. For example, as shown in FIGS. 1 and 2, Yahoo News (an example of the user interface is shown in FIG. 1) provides 4 links (shown in FIG. 2) for each article page: 'Email story', 'IM story', 'discuss', and 'printable view'. Yahoo sees the value and the desire for people to share, discuss and collaborate information together. These sites validate the fact that people want to remix and use the content in ways that are suitable to them.

Email Story—this feature allows a user to email the web page or article to one or multiple people and allows you to add a comment. However, there is no 'forum' to where the group can dynamically discuss together. Any ensuing discussion of the web page is carried out via e-mail or other conventional means such as telephone, instant messaging, etc.

IM Story—The instant messaging (IM Story) feature allows a user to discuss the story with one or more other users via instant messaging (IM). Although (IM) is more interactive and instantaneous as compared to e-mail, it is still very limited to allowing only currently online group members to participate, and there is no central location where the conversation is documented and you can add your comments (i.e. it has to be 'Instant' or you miss out)

Discuss—The discuss feature is a message board option that is widely used, but requires users to log into a public message board forum in which any user can read and post messages related (or unrelated) to the subject of the web page. A main disadvantage of this known feature is that the discussion forum is public, with all users able to read and post messages. Also, other than permitting the posting and reading of messages group by topic, these discussion or message boards do not include any features for controlling the timing or method of delivering content to users. Furthermore, while a user can use known message boards to pose a question to others, the questions must be answered textually, i.e., by the answering user typing in a response. These known message boards do not include any "structured response" feature for allowing users to respond to questions by merely selecting one of a plurality of different possible responses using a mouse, keyboard or other input device.

BRIEF DESCRIPTION OF THE DRAWINGS

Figures 1, 2:
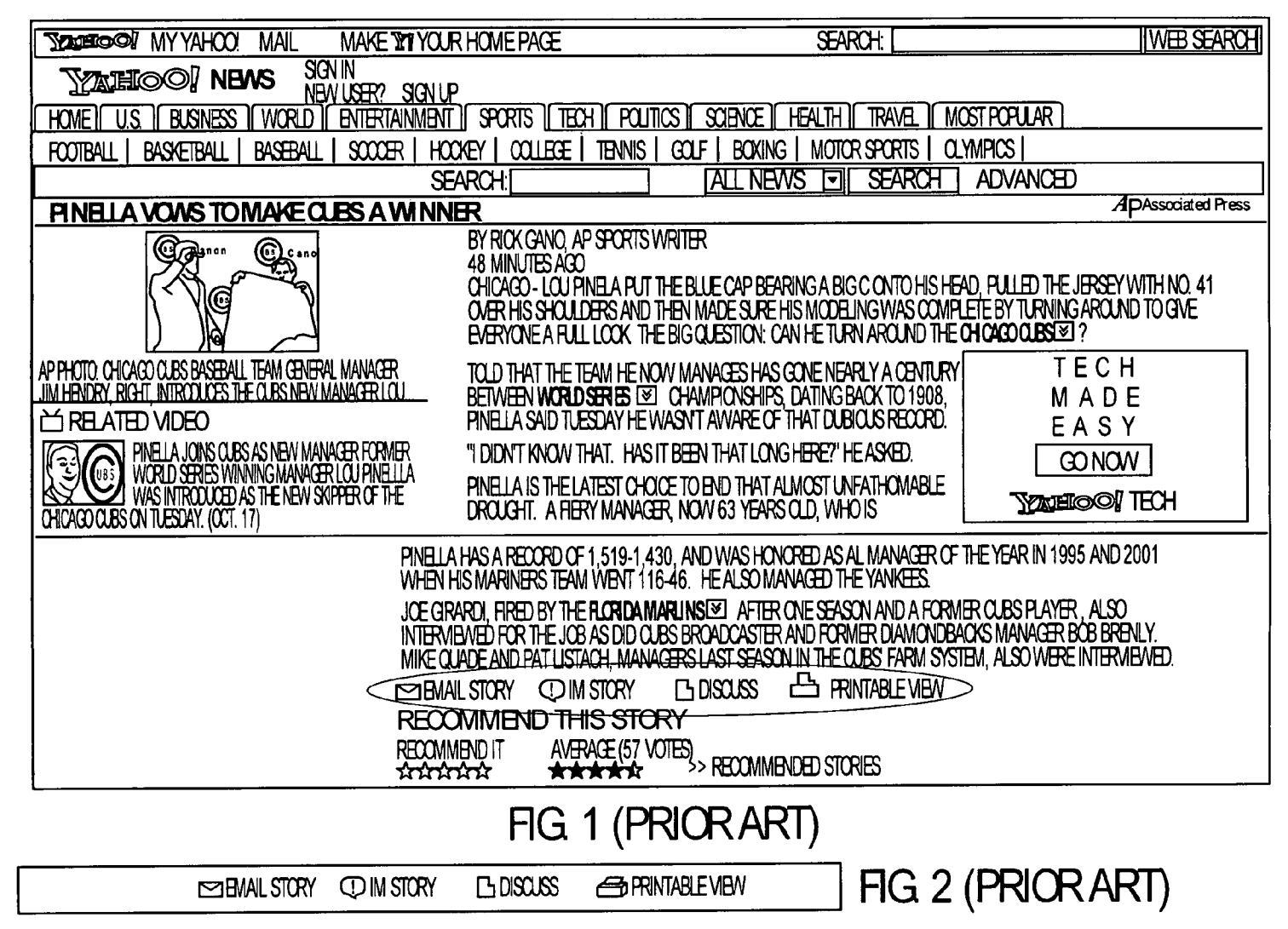

FIG. 2 illustrates the typical content sharing mechanism of the typical web page as known in the prior art;

FIG. 4 illustrates an example of the user interface for the collaboration system;

FIG. 9 illustrates an example of a more options user interface that is part of the collaboration system;

FIGS. 10 and 11 illustrate an example of a questions user interface that is part of the collaboration system;

FIG. 13 illustrates an example of a discussion board user interface of the collaboration system;

FIG. 14 illustrates an example of an additional options user interface of the collaboration system;

FIG. 16 illustrates an example of a message tab user interface of a new thread in the collaboration system;

FIG. 18 illustrates an example of a reply user interface of the collaboration system;

FIG. 21 illustrates an example of an event user interface of the collaboration system;

FIG. 22 illustrates an example of an event view by replies by question user interface of the collaboration system;

FIG. 23 illustrates an example of an event view by guest list user interface of the collaboration system;

FIG. 24 illustrates an example of a recipient setting user interface of the collaboration system;

FIG. 25 illustrates an example of a sender settings user interface of the collaboration system;

FIG. 26 illustrates an example of a remove recipients user interface of the collaboration system;

FIG. 28 illustrates an example of a change reminder date settings user interface of the collaboration system;

FIG. 34 illustrates an example of an add/create new contact user interface of the collaboration system;

FIG. 38 illustrates an example of a login user interface of the upload contacts tab of the address book;

FIG. 39 illustrates an example of a contact listing user interface of the upload contacts tab of the address book;

FIG. 40 illustrates an example of a my profile user interface of the collaboration system;

FIG. 45 illustrates an example of a user interface for adding more pieces of content to an existing thread of the collaboration system;

FIG. 47 illustrates another example of a user interface for incorporating bookmarks of a third party products into the collaboration system;

FIG. 49 illustrates an example of a private discussion forum of the collaboration system;

FIG. 50 illustrates an example of a read more link of the collaboration system;

FIG. 52 illustrates an example of a bookmarks portion of the collaboration system.

DETAILED DESCRIPTION OF ONE OR MORE EMBODIMENT(S)

The system and method are particularly applicable to web services based collaboration system and it is in this context that the system and method are described. It will be appreciated, however, that the system and method has greater utility since the system and method can be implemented with other technologies and architectures that are within the scope of the system and may be used to implement other business or social functions in addition to the collaboration system described below as an example of an implementation of the system and method.

Figure 3A:
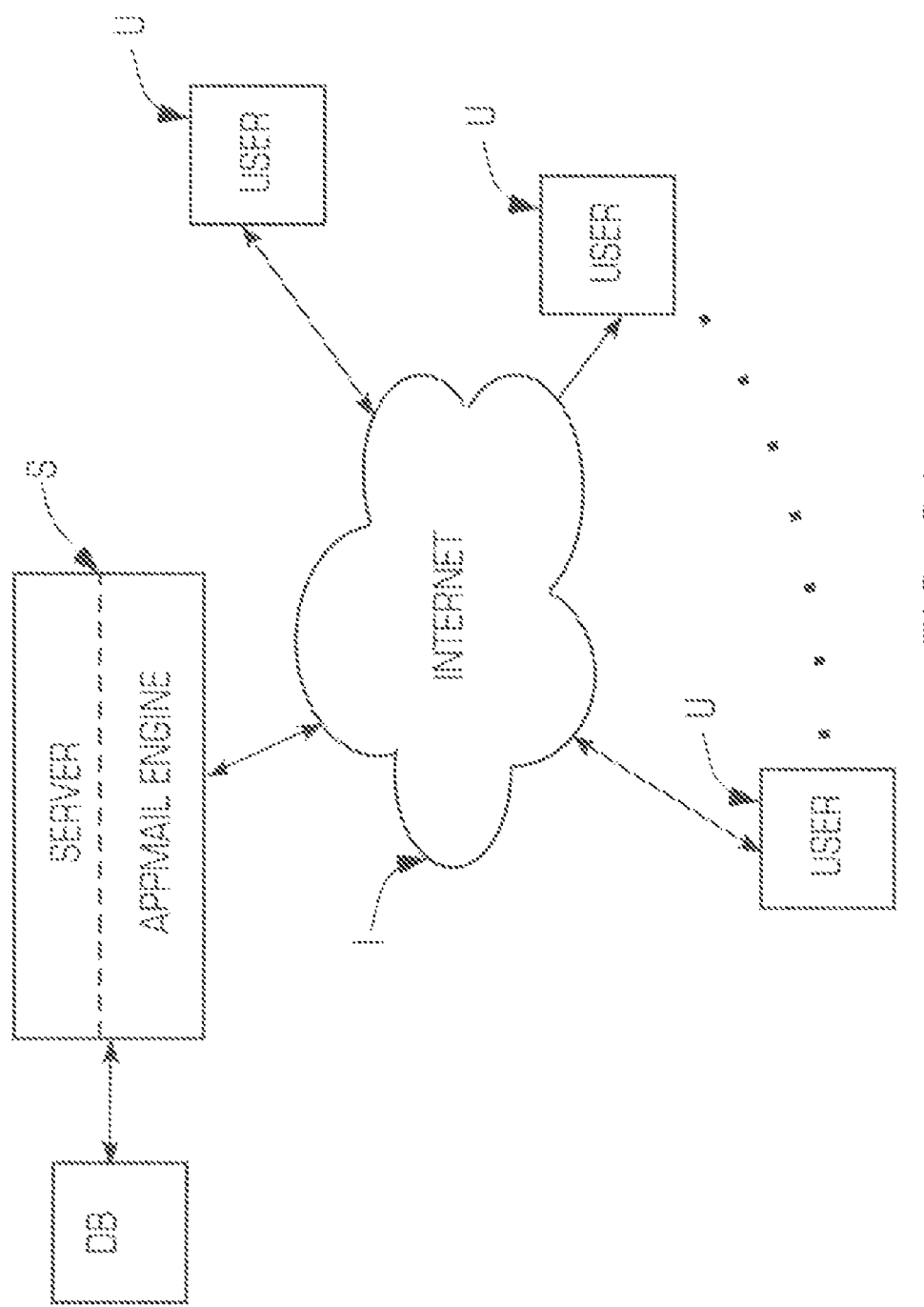
FIG. 3A is a block diagram of a web services implemented collaboration system.

FIG. 3A is a block diagram of a web services implemented collaboration system in which multiple user computing devices U send data to and receive data from a computing device S, such as a server computer for example, via a network I, such as the Internet, or another computer network. Each user computing device may be a processing unit based device with sufficient memory, processing power and connectivity to interact with the computing device S, such as a wireless email device such as the Blackberry, a cellular phone, a mobile phone, a personal computer, a laptop computer, etc. The network I may be a wired or wireless computer and/or communications network that uses a protocol to exchange information between the user computing devices U and the computing device S. The user devices U can be connected to the network I via wired or wireless connection. The computing device S incorporates and/or is connected to a storage system DB, such as a database for example, that stores and allows authorized user devices U to obtain controlled/ structured access to vast amounts of data as is well-known in the art. The hardware and software for implementing the above elements are well known and are not explained further herein.

The system may further comprise an engine, referred to herein as the APPMAIL ENGINE, that may be standalone system/component or may be implemented in a plurality of pieces of software executed by a processor of the computing device S. Thus, the engine can be implemented in hardware, software or a combination of hardware and software as shown in FIG. 3A. The engine integrates e-mail into the functionality of an underlying or "basic" software application running on the server S or elsewhere, such as a collaboration tool.

In one embodiment, the system can be used with a discussion thread collaboration tool that incorporates the APP-MAIL ENGINE. In this manner, the system is described with reference to real-world examples that facilitate an understanding of the inventive concepts. However, the APPMAIL ENGINE can be used in any other software application (referred to herein as the "basic application" or "basic program") where multiple users are seeking to collaborate with each other to accomplish one or more tasks using the basic application, and it is not intended that the present invention be limited to the discussion thread collaboration system described herein.

Thus, in FIG. 3A, the computing device S is running a basic application (the discussion thread system in the present example) that incorporates the APPMAIL ENGINE. The user devices U are each allowed a level of access with respect to the computing device S and basic application depending upon the authority assigned to the human user of those devices U. The human user of a user device U can be an e-mail user EU that interacts with the basic application only via e-mail only through the APPMAIL ENGINE; a standard user SU that can access the computing device S and use basic application directly through a web browser or otherwise to control the basic application (and consequently the APPMAIL ENGINE); or an administrative user AU that has all the rights and privileges of a standard user SU, but can also add/delete standard users and also can access certain restricted, administrative portions of the basic application. As described herein below, the system and method allow the e-mail users EU to participate in the collaborative effort via the basic application, even through these e-mail users EU cannot directly access and use the basic application running on computing device S. For ease of understanding, further reference to administrative users AU is not made. Instead, the following disclosure refers simply to a "user SU" to refer to either a standard user SU or an administrative user AU, because both of these users can directly access the computing device S and log in to the basic application to control same. As noted, e-mail users EU can interact with the computing device S and basic application only via specialized e-mail (APPMAIL).

Figure 3B:
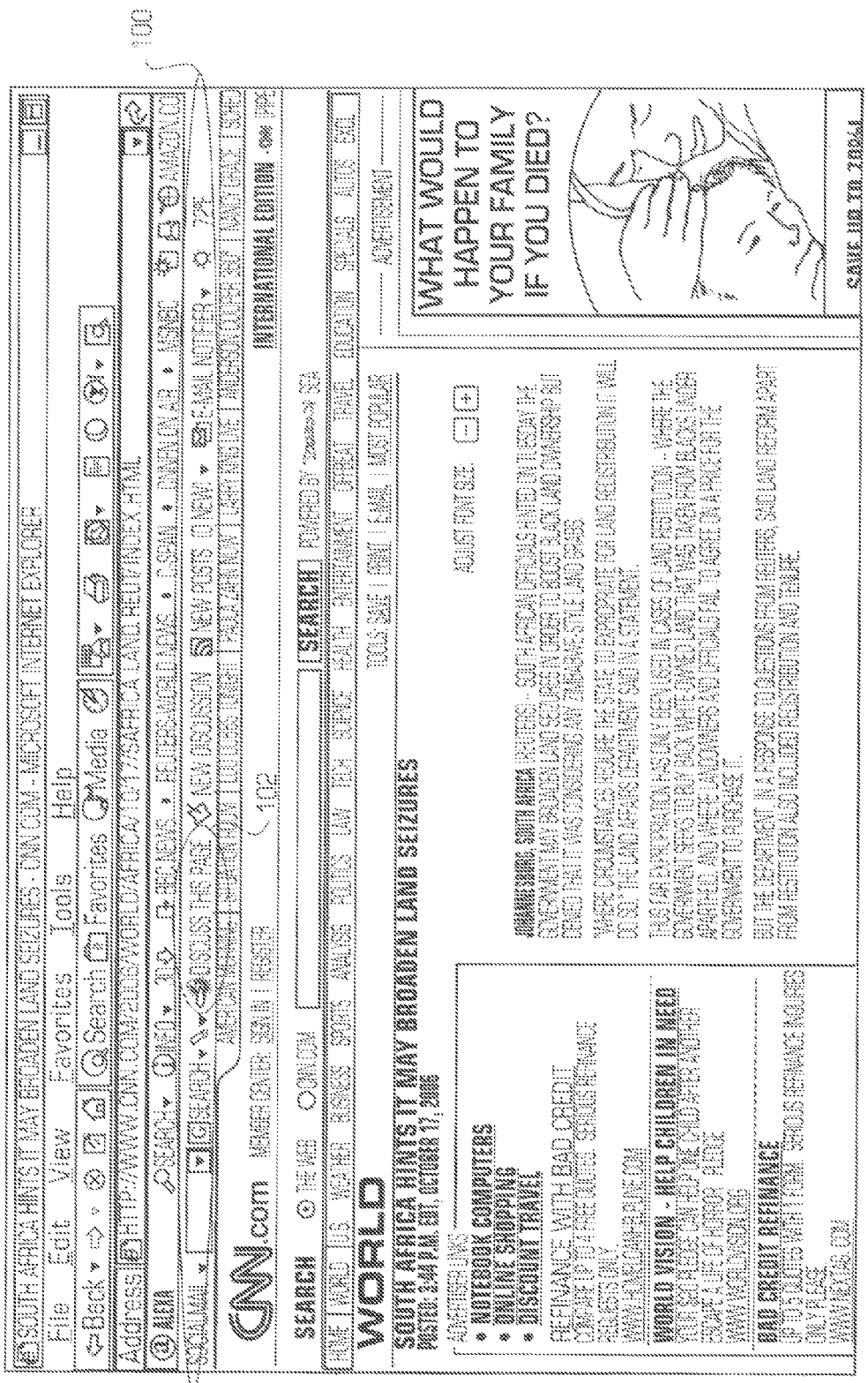
FIG. 3B illustrates an example of a browser interface with a collaboration system portion.

FIG. 3B illustrates an example of a browser interface with a collaboration system portion. In one exemplary implementation, the collaboration system and discussion thread may be known as SocialMail. As shown in FIG. 3B, web page has been loaded by a typical browser application that may include a SocialMail toolbar 100 that further includes a button 102 on the web browser toolbar so that the SocialMail functionality can be linked to/activated by the toolbar button of a web browser. In such case, once a user finds a page/article that the user desires to share and discuss with others, the user can simply click on the "Discuss this page" (or otherwise labeled) button 102 from the browser toolbar. This will initiate a SocialMail Discussion (sometimes simply referred to herein as a "SocialMail" or "SM") and E-mail it directly to one or multiple people as shown and described in further detail below.

Figure 4:
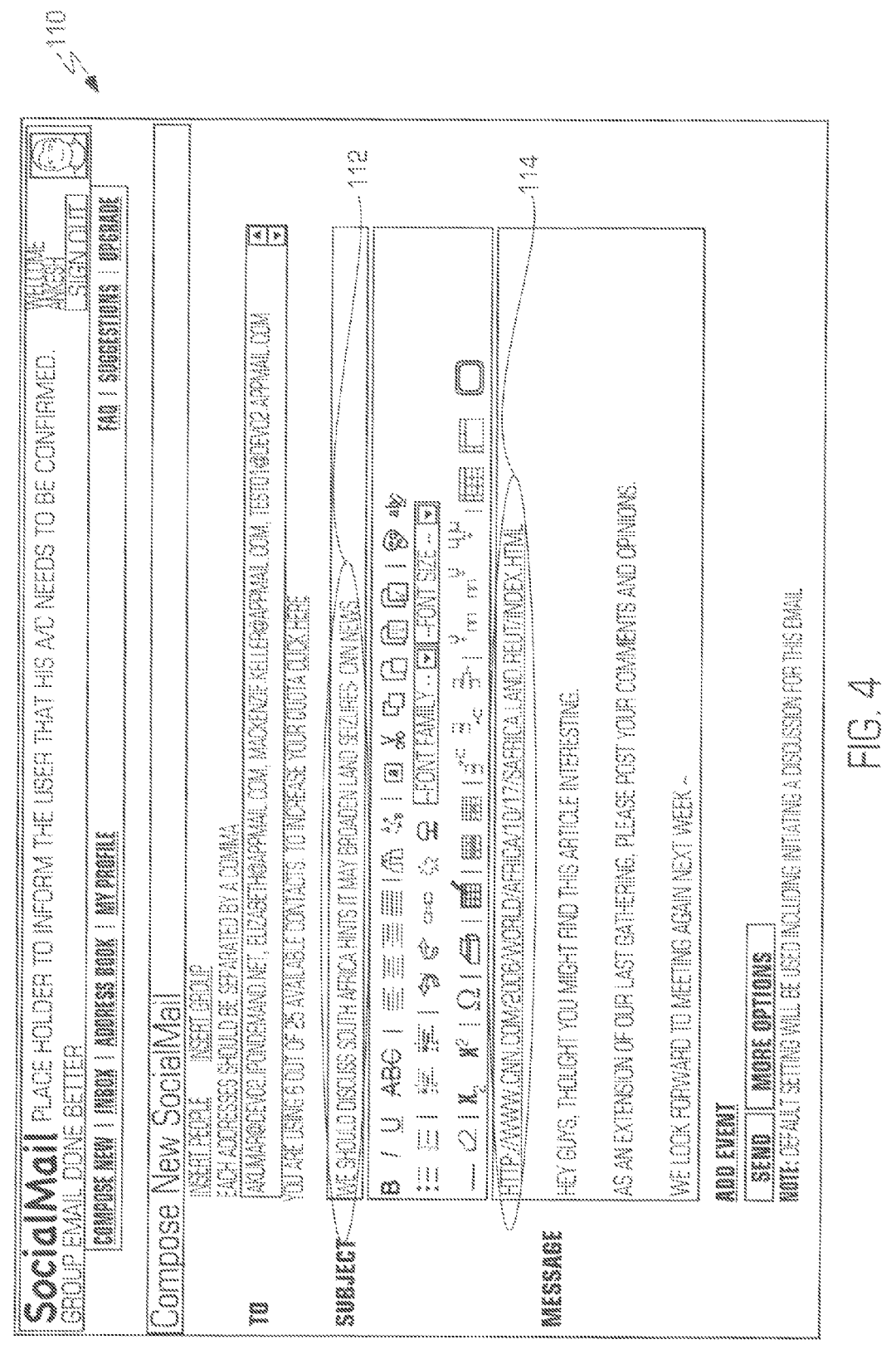

FIG. 4 illustrates an example of the user interface for the collaboration system. Thus, once a user selects the "Discuss this page" toolbar button 102, a SocialMail popup 110 as shown in FIG. 4 is displayed and the fields in the popup are populated so that the subject line in populated with the title of the article 112 displayed in the web browser window when the toolbar button is selected, and the link 114 to the article is inserted into the message of the body. The user can then add email addresses and an optional personal note before sending out the SocialMail e-mail by selecting "Send," as shown in FIG. 4.

Partnership with Content Provider—Include SocialMail Button in Web Content

Figure 5:
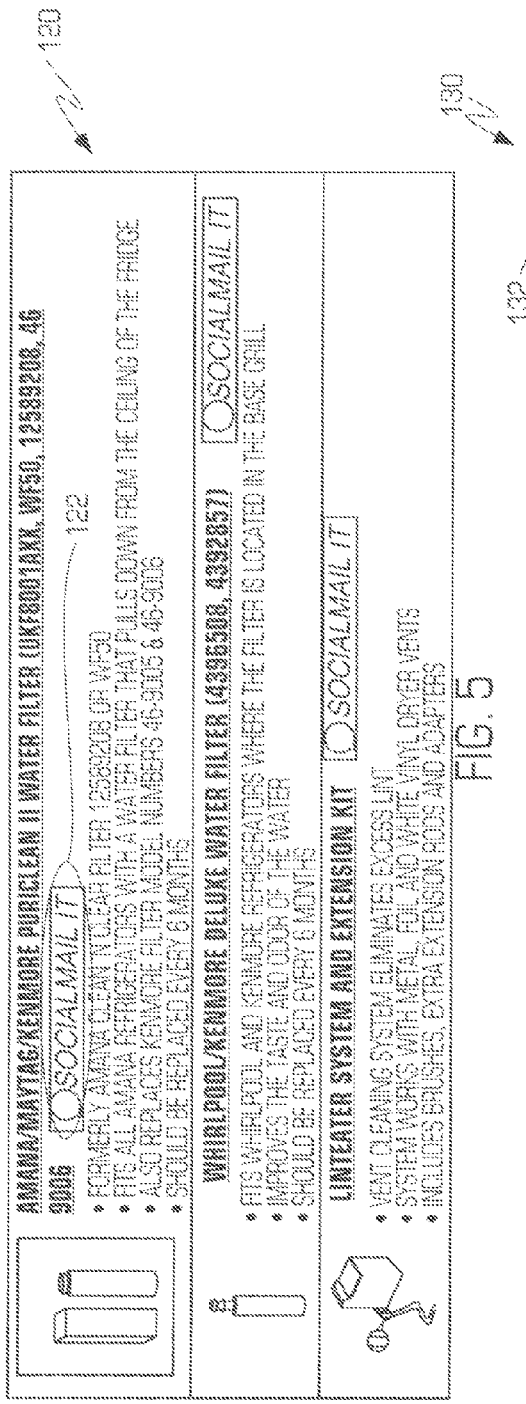
FIG. 5 illustrates an example of a third party web page that contains a collaboration system icon.

The system may also permit partnership(s) with content providers. Using the system, any website content provider such as a merchant, photos, videos, music, news provider, travel, etc can utilize the system to allow its website consumers or visitors to use the SocialMail functionality to discuss news, products, and other items on the content provider's website, thereby increasing traffic and/or sales at the website. As shown in FIG. 5, the website provider page 120 includes a SocialMail button/icon 122 (shown as "SocialMail it" icon in the example below) within the website content and associated with a particular item or news story. A user then simply clicks on or otherwise selects the "SocialMail it" icon that is associated with the web content of interest in order to initiate a discussion.

In Addition, a publisher can extend the use of this button to include page content and links back to their site, enabling those that receive the SocialMail to return to the publishers page, increasing the number of visitors and as a result of discussion potentially repeat return visits.

Figure 6:
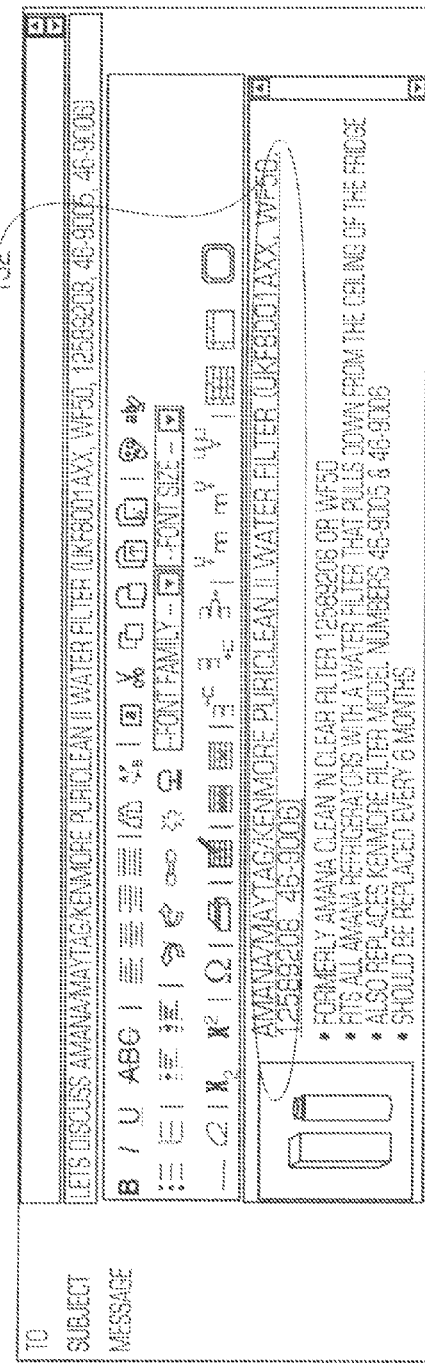
FIG. 6 illustrates an example of the user interface of the collaboration system when a user selects the collaboration system icon from the third party web page.

In response to a user selecting the "SocialMail it" icon, the system creates a SocialMail popup 130 (shown in FIG. 6) and will populate the subject line with the item title, provide the link 132 to the article within the message of the body, and copy over any images of the relevant content. As described and shown above, the SocialMail will include a "To" field in which the originating user types one or more e-mail addresses or groups of same to which the SocialMail relating to the web content is to be delivered.

With respect to this aspect of the system, any web content provider that desires to partner with the SocialMail system can include the "SocialMail it" or otherwise labeled button in its web content. In one embodiment, the web content provider can simply access the SocialMail website and from the indicated area, select and drag the SocialMail icon onto its own web page where desired, thus linking its content with SocialMail as just described. This can be accomplished, e.g., using a Flash drag and drop routine or the like.

Originate a SocialMail Discussion from the SocialMail Website

Figure 7:
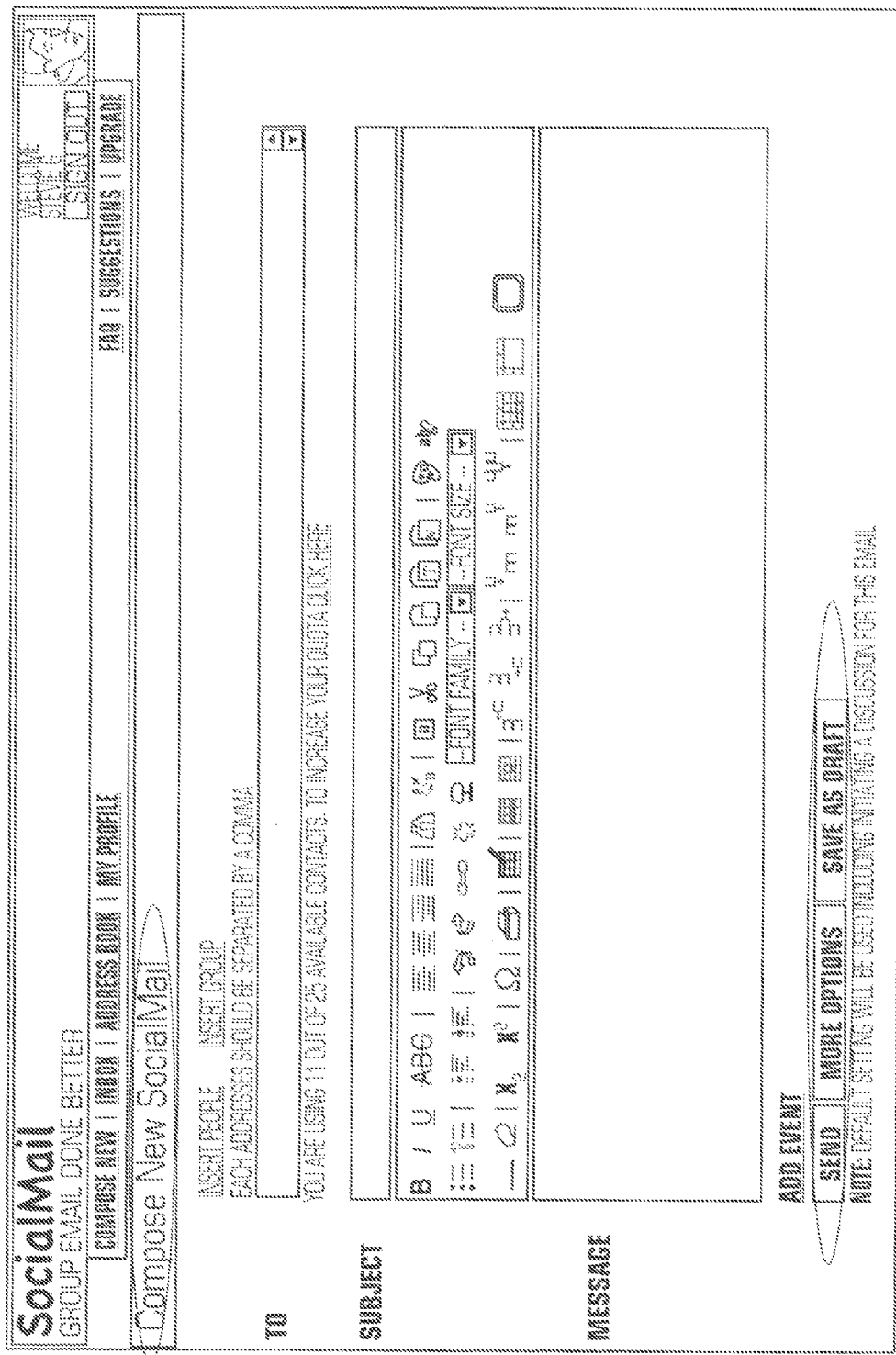
FIG. 7 illustrates an example a user interface for originating a new discussion from the collaboration system website.

In accordance with another aspect of the system, a user can use the SocialMail website to initiate a discussion related to a particular topic as shown in FIG. 7. In such case, the user simply logs into his or her SocialMail account at the SocialMail website with a username and password. The user can then create a new SocialMail by selecting "Compose New" (see below) from the SocialMail webpage, which causes the "Compose New SocialMail" template to be presented to the user as shown below. Using the template, the user enters one or more recipient e-mail addresses (or groups of e-mail addresses) in the "To" field, enters a subject in the "Subject" field, and composes a message in the "Message" field as shown below, very similar to an e-mail.

Add Event Feature

Unlike a conventional e-mail, in addition to the above, the template includes an "Add Event" feature as shown in FIG. 7 that is optionally completed by the originating user. Using this feature and the fields provided, the sender/originator of the SocialMail discussion can inform recipients when and where a meeting is desired. In particular, the user types a location in the "Where" field and uses the drop down and calendar icons to select the date and time of the event. Once recipients have replied to the SocialMail, they will then receive a reminder e-mail relating to the scheduled event, and they can use the reminder to save the event onto their Calendar (i.e. Google, Yahoo, Outlook, etc.)

Figure 8:
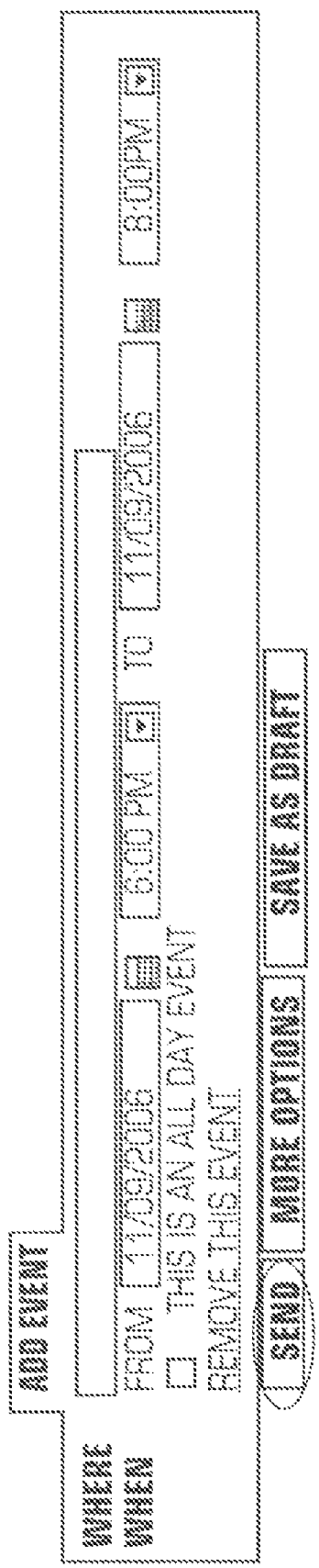
FIG. 8 illustrates an example of an add event user interface that is part of the collaboration system.

Once the event is added (if desired) to the SocialMail being created, the originating user then selects the "Send" icon as shown in FIG. 8 to send the message to the intended recipient(s).

As described below, once the SocialMail is sent, it will be available as part of a discussion board for the sender and the recipients to post and review comments, and it will be available for forwarding by recipients to others (unless the original sender prohibits forwarding as discussed below). Unless restricted by the sender of the SocialMail, all recipients will be able to view the "guest list," i.e., the list of recipients of the SocialMail, and the sender and recipients will be able to contact each other directly for further communication, via private message or instant messaging, Skype (VOIP) and/or the like.

The add event user interface may also include a save as draft button (See FIG. 8) and/or a More Options prior to send (See FIG. 8).

Save as Draft Prior to Send

The sender can choose to save this as a Draft before sending. This allows the user to exit the system and then log back in at any time. The SocialMail will be saved 'as is' in their draft folder. They can then do More Options or send it out.

More Options Prior to Send

Before sending the SocialMail, the sender of the SocialMail can select the "More Options" icon to add or remove functionality to the SocialMail being composed. Selecting the "More Options" icon will present the user with the More Options template screen as shown below, which includes options for "Questions" "Settings" and "Additional Options."

Questions

Figure 9:
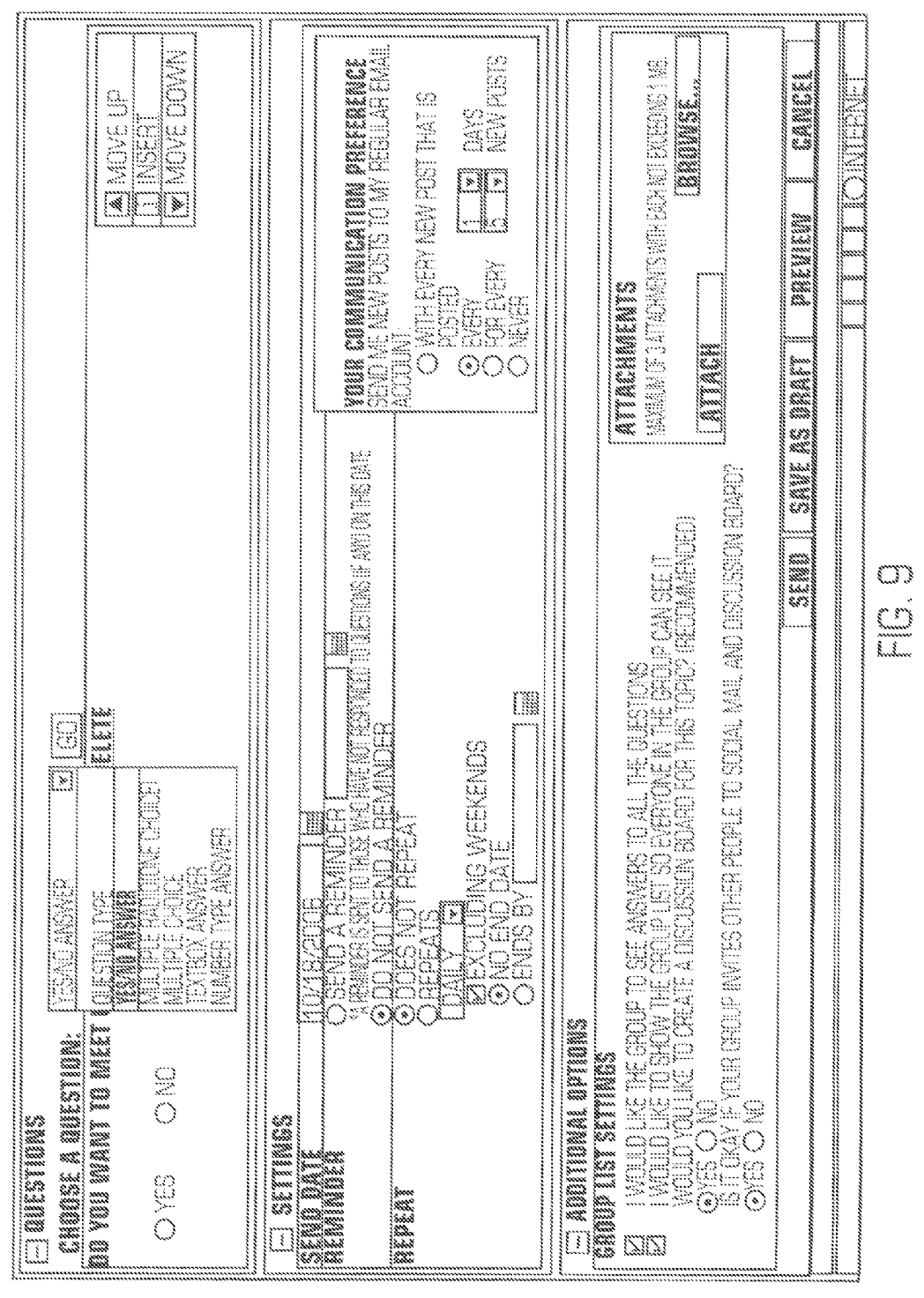
Figure 10:
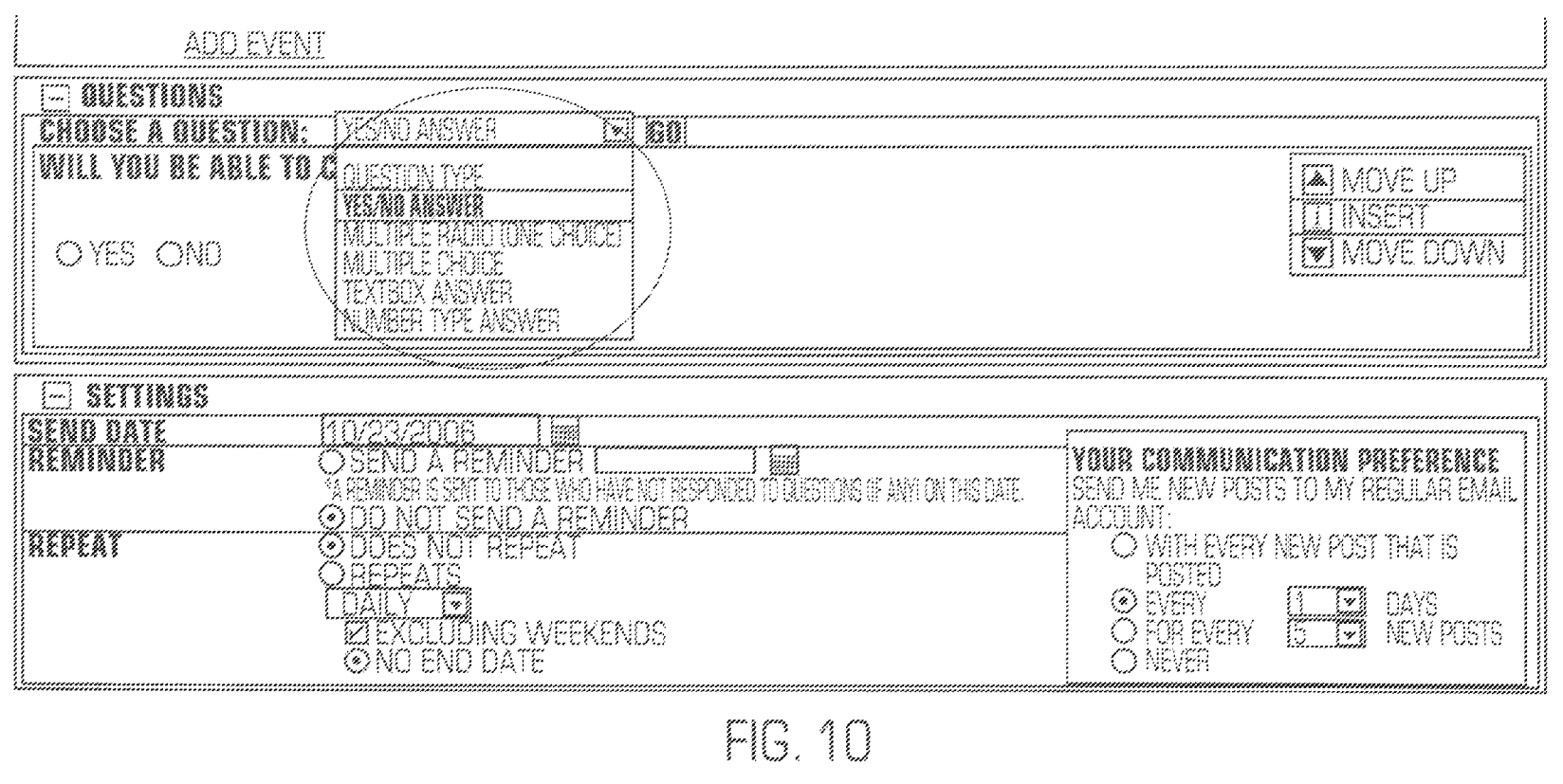
Figure 11:
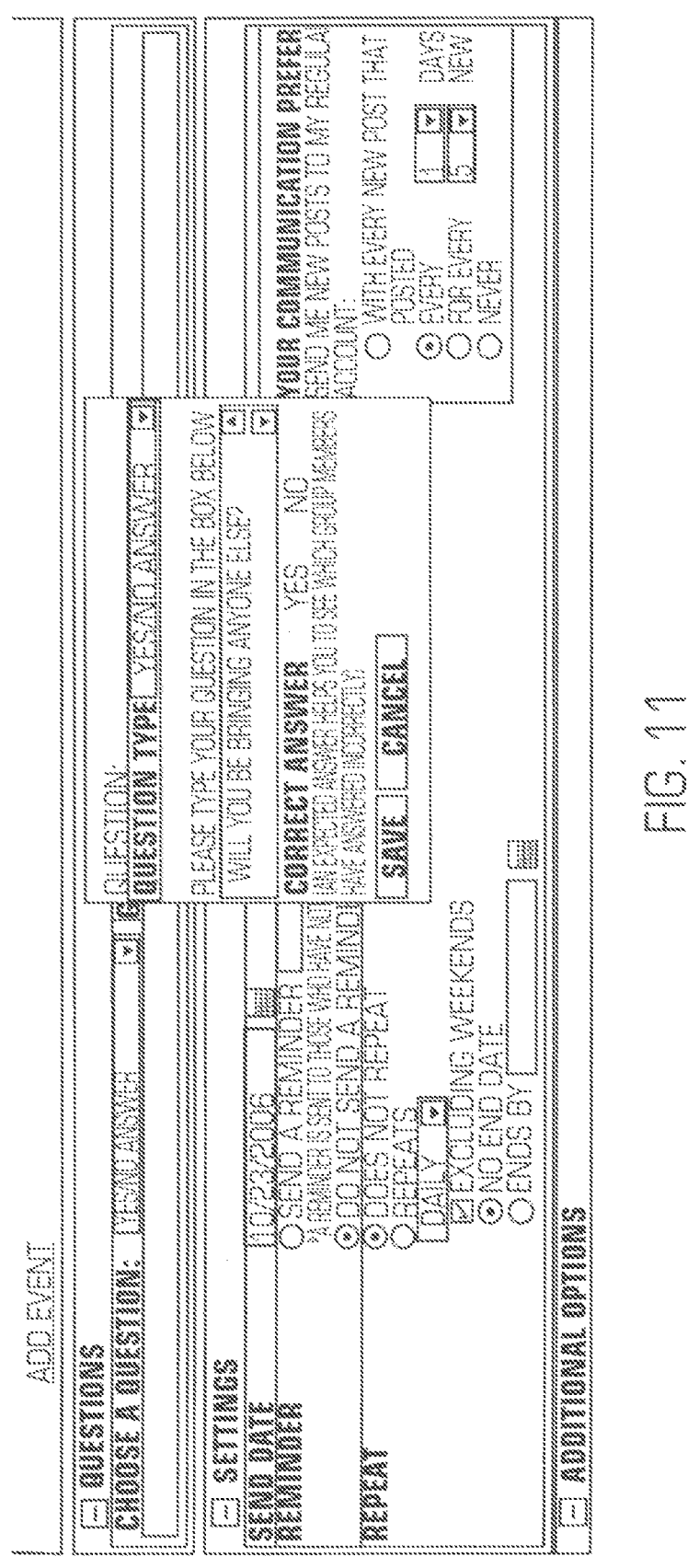

The user interface for questions is shown in FIGS. 9-11. It can be seen that the first choice in the More Options template is the ability to add one or more questions into the SocialMail, wherein the questions are suitable for structured responses or can be open-ended questions that require unstructured textual responses. As described below, the structured responses to the questions as input by recipients of the SocialMail are easily extracted to compile a database of the question responses for use by the sender and/or for archival/compliance purposes. More particularly, the SocialMail sender uses the drop down area shown in FIG. 10 to select a type of question to add, with the choices in the illustrated embodiment being yes/no, multiple radio (one choice), multiple choice, textbox (unstructured text) answer, or number answer.

Once the user selects a question type, a popup screen as shown in FIG. 11 for that question type is displayed in order for the user to enter the particular question (see below). The sender of the SocialMail can add as many of the same or different type questions to the SocialMail as desired by repeating this process. As shown in the example below, the user selected the "yes/no" question type, and the user is then prompted to enter the question using the popup screen, which also requests that that user indicate the "correct" or expected answer which is not shown to recipients, but which can facilitate later reporting by easily showing which responding recipients did not answer as desired or expected. The question(s) will then be included in the SocialMail sent to recipients, with a response data section for the recipient to enter his/her responses, in a structured fashion by selecting one of a plurality of predefined responses or in an unstructured fashion by typing a response into a text box.

Settings

Figure 12:
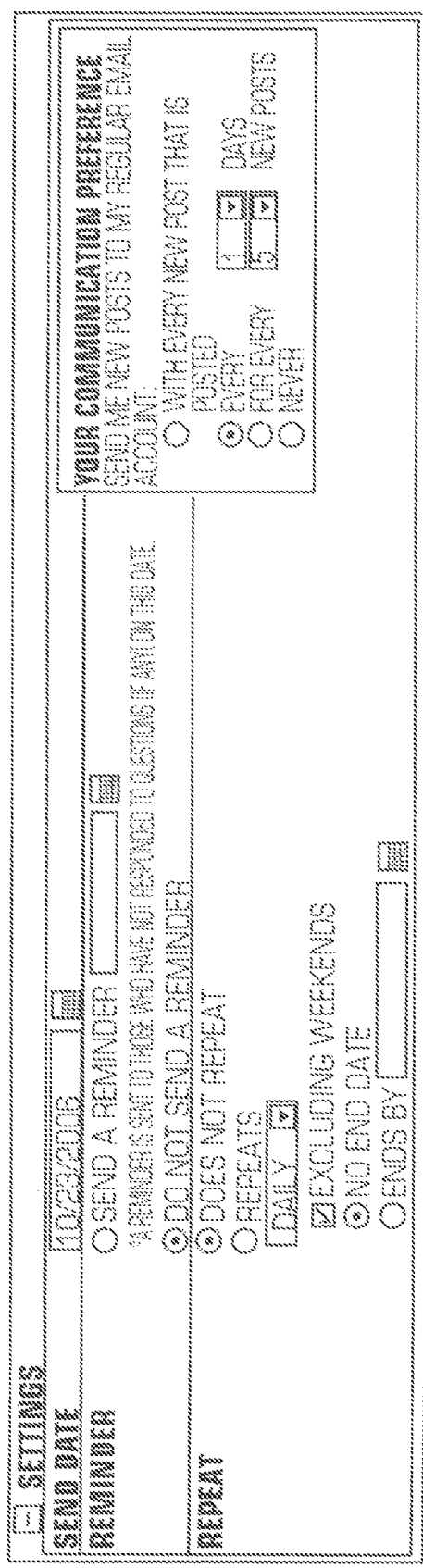
FIG. 12 illustrates an example of a settings user interface of the collaboration system.

The More Options template also includes a "Settings" section (an example user interface is shown in FIG. 12) by which the sender of the SocialMail can set parameters associated with the new SocialMail being created. In the present example, the originating user can pre-set the send date for automatic future sending of a SocialMail, automate e-mail reminders to recipients that haven't responded and to automate re-sends of the SocialMail to non-responding recipients. Here, the sender of the SocialMail can also set his or her communication preferences, i.e., the preferred frequency (or optionally method) by which the sender of the SocialMail discussion is notified of new posts or responses to the SocialMail. A recurrence is a new instance of a specific item, e.g., a weekly Friday lunch email may recur each Wednesday. A resend is the resending of a specific email when the particular recipient did not respond previously. The "Settings" portion of the More Options template is shown in FIG. 12. It can be seen that the sender of the SocialMail can enter a future send date, can elect to send a reminder to non-responding recipients on a future date, can set a repeat frequency to send the same SocialMail every so often, e.g., daily, weekly, monthly, yearly, until a certain future date, and can select a communication or "notify" preference as to how often the originating user is notified concerning responses to the SocialMail, e.g., for every new reply (post), every 1 or more days, every 2 or more posts, never.

Figure 13:
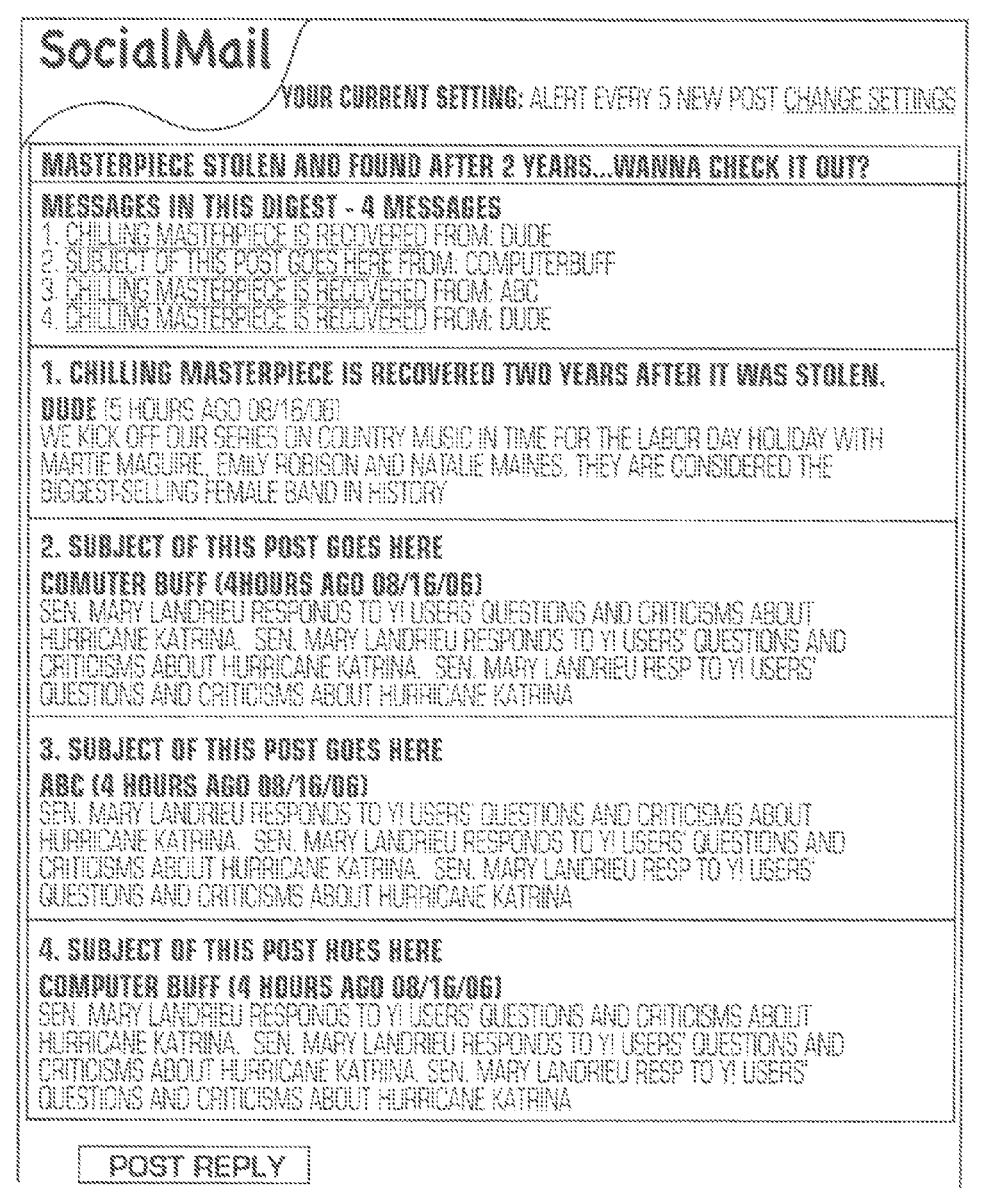

In accordance with one embodiment, users are notified of activity concerning a SocialMail discussion topic by way of a Digest Notice (see FIG. 13 for an example of the user interface) that comprises an email image summary of all new posts and comments, wherein the e-mail comprises an html image as shown below. A Digest Notice recipient can simply review the image to assess activity concerning a SocialMail topic or, if desired, can receive more details by selecting any one of the comments so as to navigate via web browser to the particular SocialMail discussion board related to the present SocialMail topic. Likewise, if the recipient of a Digest Notice desires to add a comment to the discussion, the user simply selects the "Post Reply" icon to navigate via web browser to the particular SocialMail discussion board related to the present SocialMail topic where a comment can then be posted.

Additional Options

Continuing with the discussion of "More Options" available to an originating user of a SocialMail prior to sending the SocialMail, the user is also presented with "Additional Options" (an example of the user interface is shown in FIG. 14) by which the user can change group list settings (i.e. hide guest list, hide responses, remove the discussion board, remove the forward option for recipients). Also, the sender can use the "Additional Options" section to attach one or more attachment files to the SocialMail so that the attachments are delivered to the recipients of the SocialMail. The originating user then sends the SocialMail by selecting the "Send" icon, or save a draft of the SocialMail or can preview the SocialMail by selecting these icons as shown above.

Recipient View of SocialMail

Envelope

Figure 15:
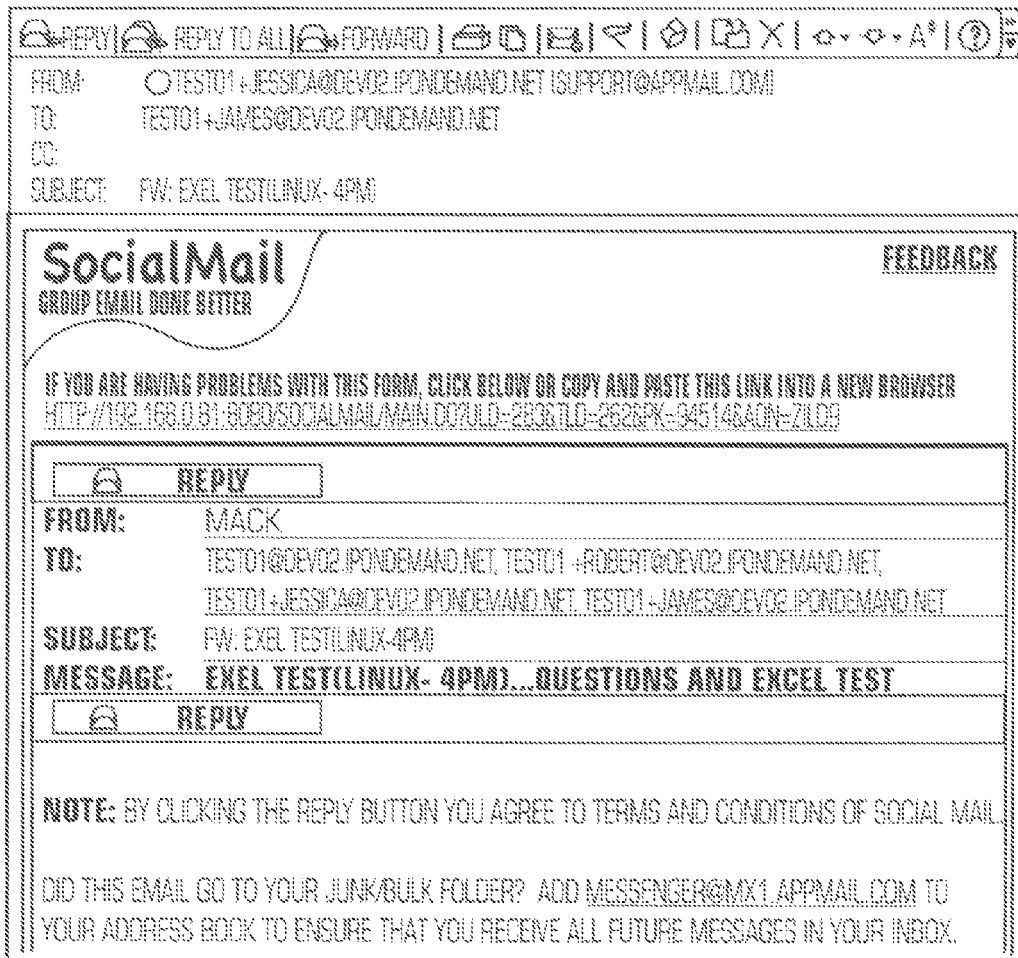
FIG. 15 illustrates an example of a recipient envelope user interface of a new thread in the collaboration system.

Intended recipients of a SocialMail will receive an envelope (an example user interface is shown in FIG. 15) in their email inbox which, when opened, appears as shown below and invites the recipient to join the discussion/answer questions, etc. The recipient can review the subject of the SocialMail, can navigate to any content hyperlink embedded in the SocialMail, etc. If the recipient chooses to participate in the related discussion the recipient will select the "Reply" button (the first time a recipient replies to a SocialMail, the recipient may be required to register with the SocialMail website or the recipient may be registered in a background operation).

SocialMail View—Message Tab

Figure 16:
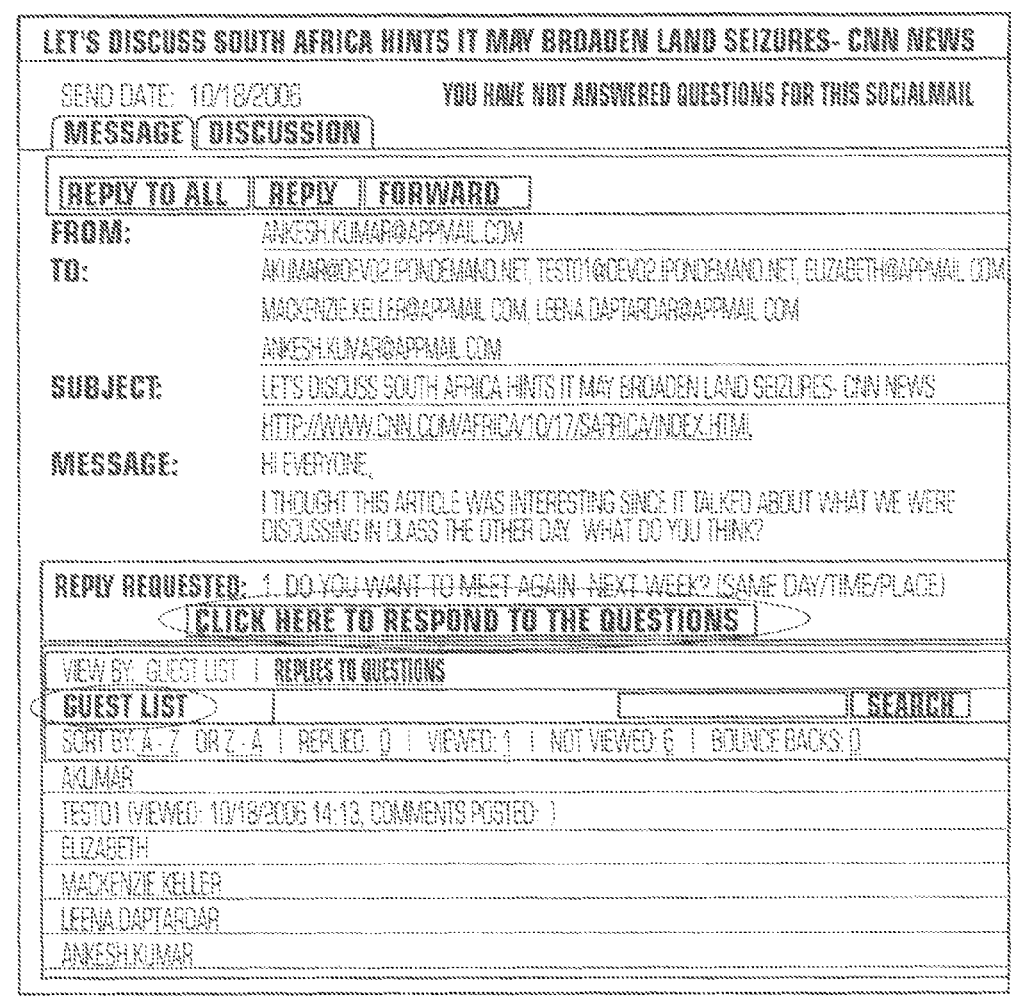

As shown in FIG. 16, when a recipients selects the "Reply" button, the user is presented with the fully functional SocialMail in a browser window. From here, under the "Message" tab of the SocialMail as shown below, the user can see the original SocialMail message and the recipient can "Reply" "Reply to All" or (unless deactivated by the originating user when composing the SocialMail) can "Forward" the SocialMail to others by selecting the appropriate link. If the SocialMail as created by the sender includes one or more questions, the recipient user can also select the "Click Here to Respond to Questions" icon to be presented with the questions (this is described further below).

Some Available Activities from the Message tab view may include:

Reply to all button allows user to post a comment in the discussion board (located in discussion tab)

Reply button allows the user to send a message back to the sender

Forward button allows user to forward the SocialMail to others

There is a large button in the center of the page to respond to the questions

View by guest list allows user to view names of all participants and to see who has/not responded View by replies to questions allows user to view all participant answers to questions (if there were questions in that SocialMail)

SocialMail View—Discussion Tab

Figure 17:
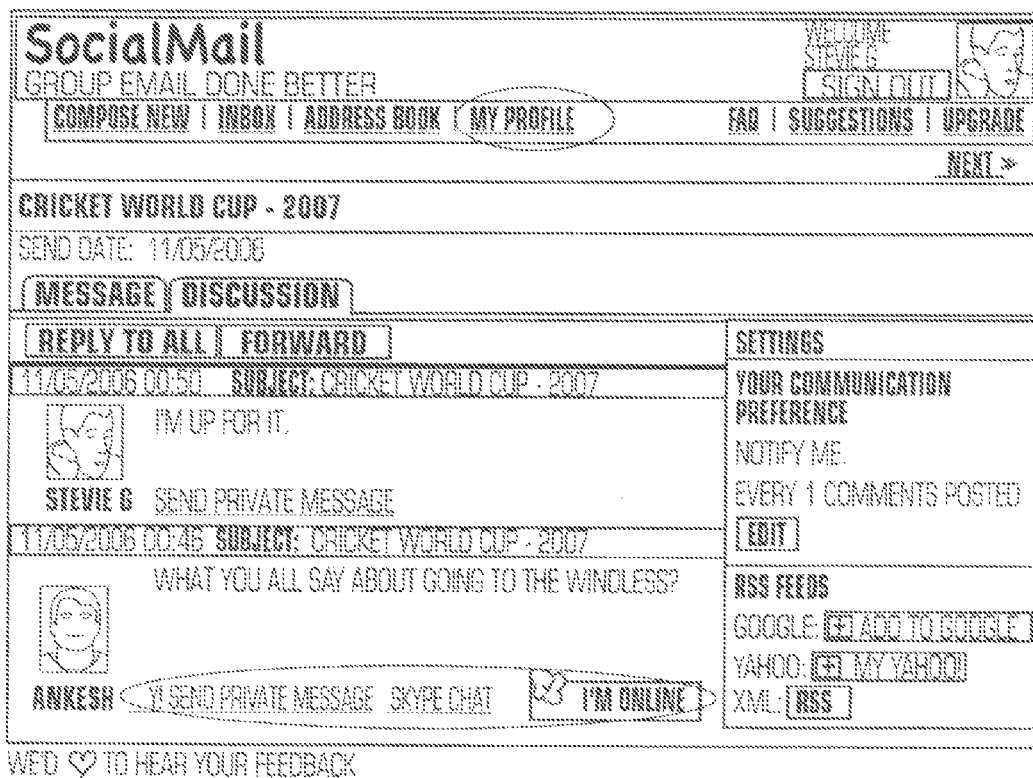
FIG. 17 illustrates an example of a discussion tab user interface of a new thread in the collaboration system.
Figure 1B:
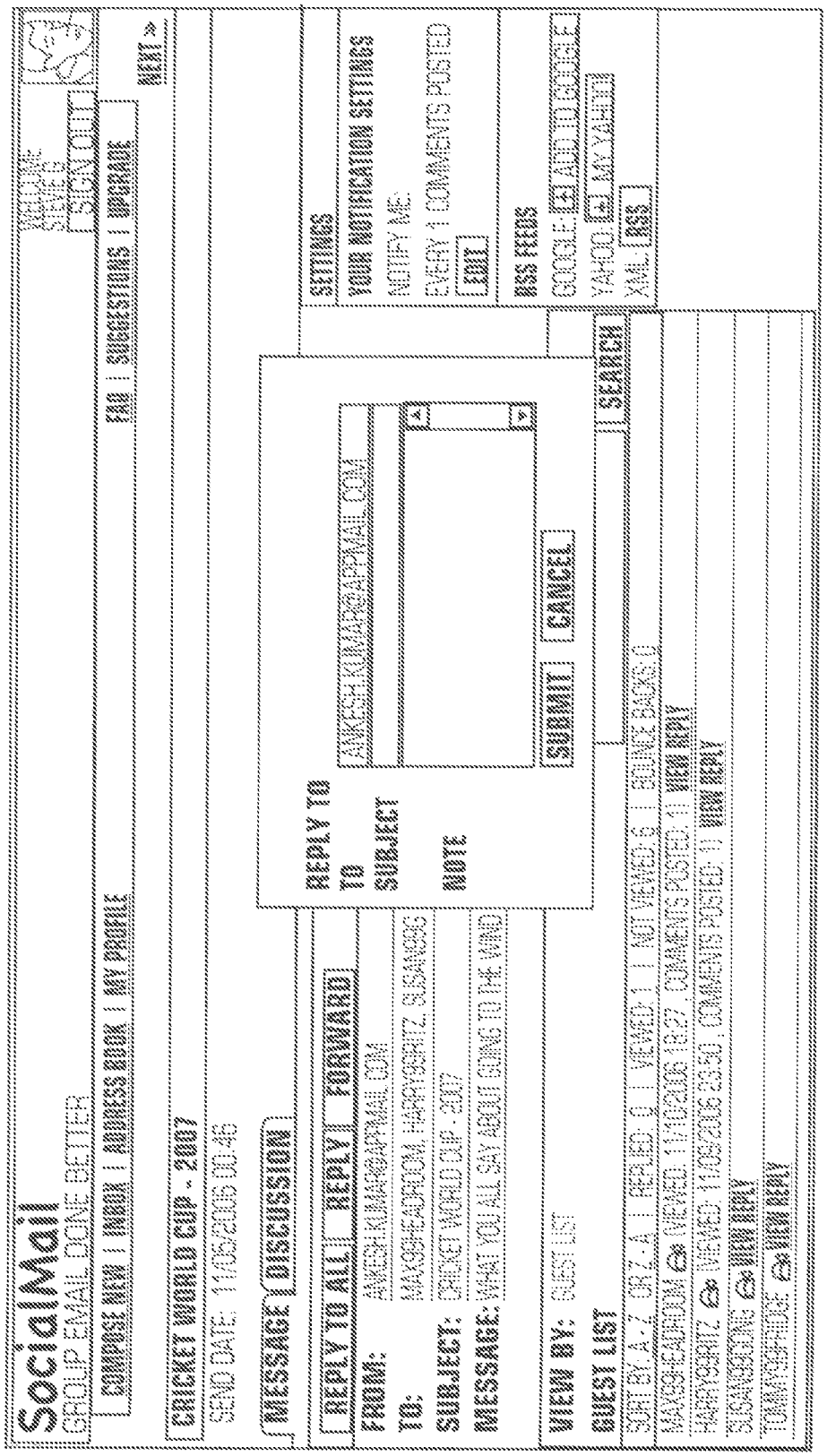
FIG. 1 illustrates a typical web page that contains a content sharing mechanism as known in the prior art.

A recipient can select the "Discussion" tab of the SocialMail user interface (see example user interface as shown in FIG. 17) to view the original SocialMail content and also all comments/replies posted in response thereto as shown below.

Some Available Activities from Discussion tab view may include:

User can view all comments and posts in this discussion board

Reply to all button allows user to post a comment in the discussion board

There is a Send private message link under each post-allowing users to send private messages to each other My Profile at the top of the page allows user to add their Yahoo ID, IM, and Skype information Users can click on these IM icons to start additional chats with each other Change your communication preferences to receive daily posts Click on RSS to bring this discussion board directly to your desktop, Google or yahoo account SocialMail View—Message Tab—Functionality Returning to the message tab shown in FIG. 16, the functionality provided to the user from this tab are described in more detail.

Reply button—selecting the "Reply" button from the Message tab of the SocialMail leads to the presentation of a pop up window (an example user interface is shown in FIG. 18) into which a private message to the sender of the SocialMail can be inserted and sent when the "Submit" button is then selected. This reply message is private and will be received by only the individual recipient to whom it is sent.

Figure 19:
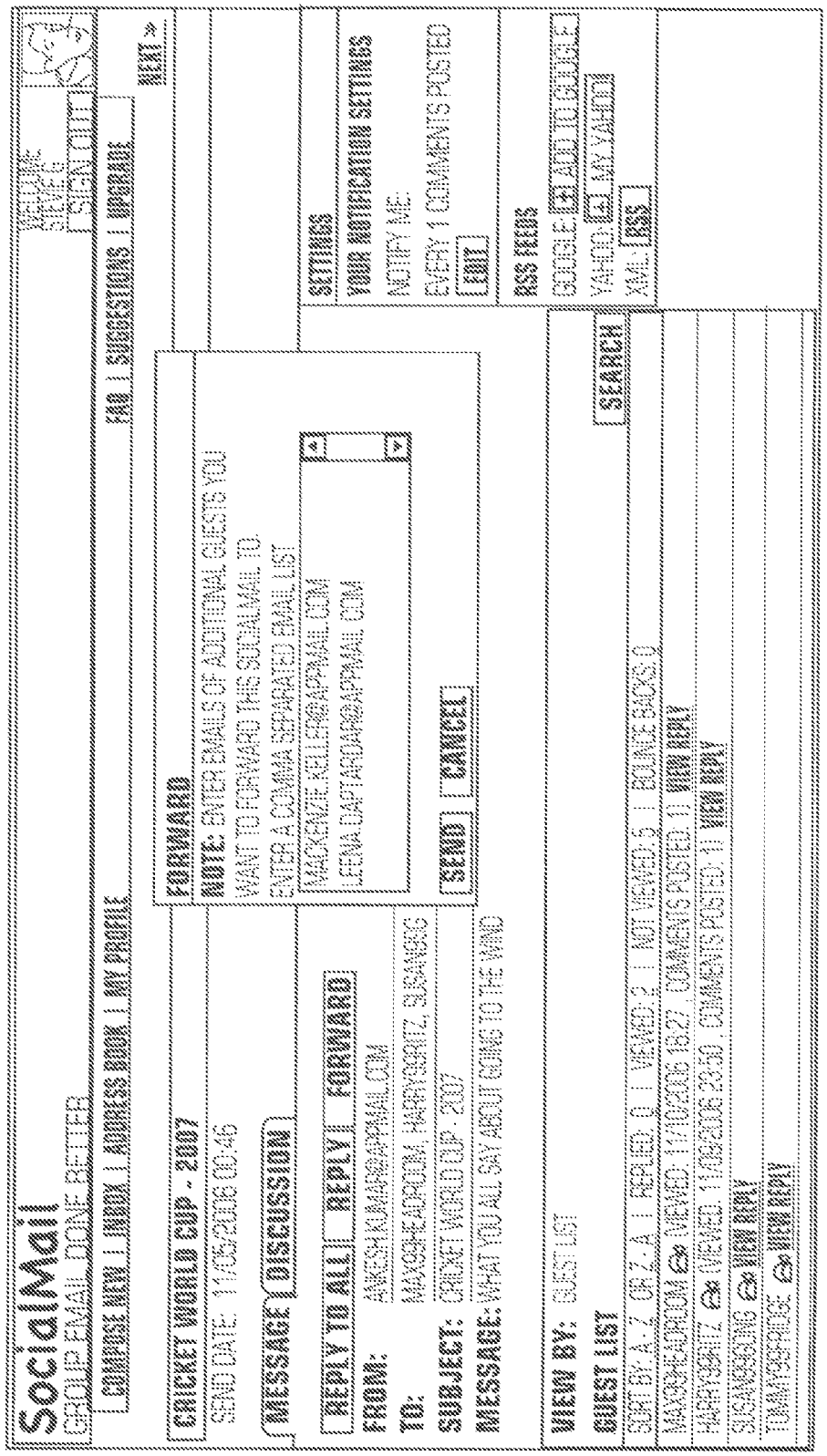
FIG. 19 illustrates an example of a forward user interface of the collaboration system.

Forward button—selecting the "Forward" button from the Message tab view of a SocialMail initiates a pop up window (an example user interface is shown in FIG. 19) into which one or more e-mail addresses to intended recipients are inserted. The SocialMail is then forwarded to these e-mail addresses when the user selects the "Send" button. As noted above, when composing the SocialMail, the sender can disable this forwarding feature in the "Additional Options" section of the "Compose New SocialMail" template by selecting the "No" answer to the question "Is it okay if your group invites other people to SocialMail and Discussion Board?"

Answer Questions—selecting the "Click here to respond to the questions" button from the Message tab view of a SocialMail initiates a pop up window (shown below) that lists the previously entered responses or each question and that includes fields associated with each question and into which the user can input (select) a structured (predefined) response to each question or, if the question is created as a "textbox answer" question by the sender of the SocialMail, the pop up window will include a text box associated with such question to receive a textual (unstructured) response to the question. When the recipient has answered all questions, he/she will select the "Click here to respond to the questions" or otherwise labeled button in the question pop up window to submit the answers.

Figure 20:
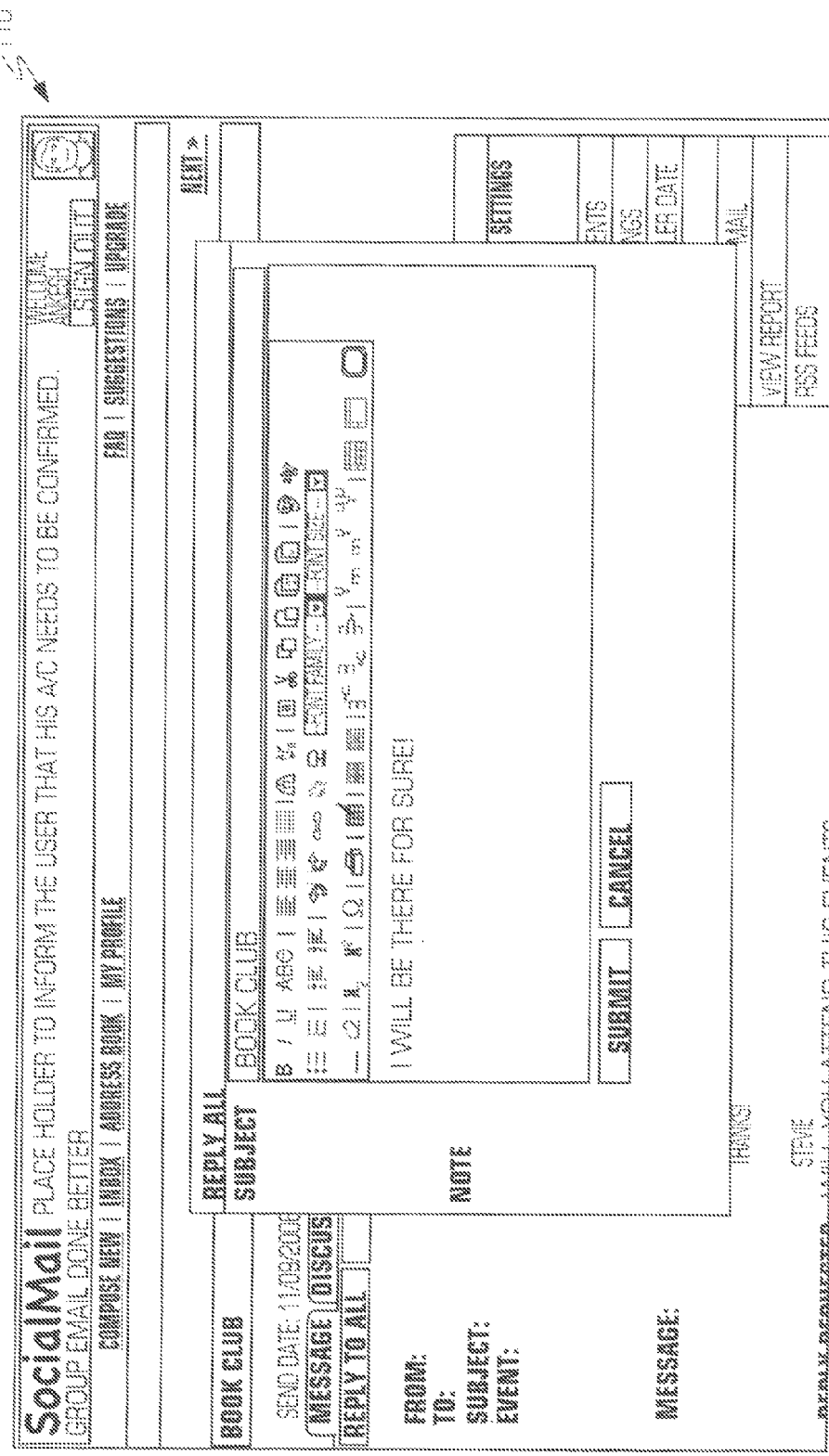
FIG. 20 illustrates an example of a reply to all user interface of the collaboration system.

Reply to All—selecting the "Reply to All" button from the Message tab view of a SocialMail initiates a pop up window (an example user interface is shown in FIG. 20) where the user can post comments related to the SocialMail so that such comments will be available to the sender and all recipients of the SocialMail by viewing the "Discussion" tab view of the SocialMail as described above, i.e., any comments entered via "Reply to All" will then post to the Discussion tab of the SocialMail when the user selects the "Submit" button. After a recipient clicks the submit button, these comments will be posted in the discussion board (as seen in the Discussion Tab picture)

Event or Question

Figures 21, 22:
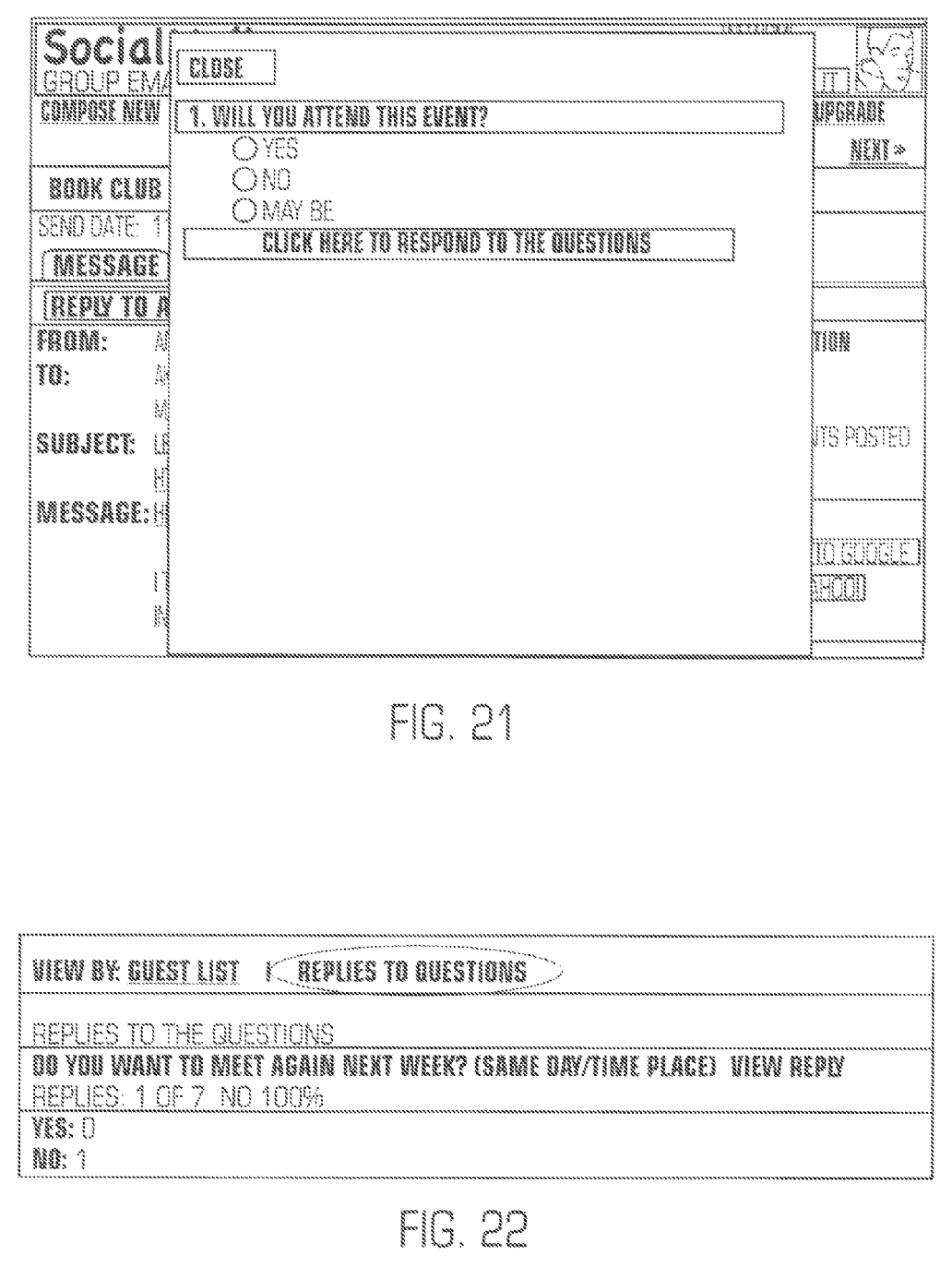

If there in an Event or questions associated with this SocialMail, there will be a button to click on to answer the questions. The questions will appear in a pop up screen (an example user interface is shown in FIG. 21)

View by: Replies to Questions/View By: Guest List

The Message tab view of the SocialMail as shown above includes a section labeled View by: Replies to Questions/View By: Guest List. In this section, the viewing user can change the view by selecting one or the other view option, i.e., "View by: Replies to Questions" or "View By: Guest List."

"View by: Replies to Questions"

If the "View by: Replies to Questions" link is selected, the section will appear as shown in the example in FIG. 22, so as to reveal all recipient responses to the questions of the SocialMail.

"View by: Guest List"

Figures 23, 24, 25:
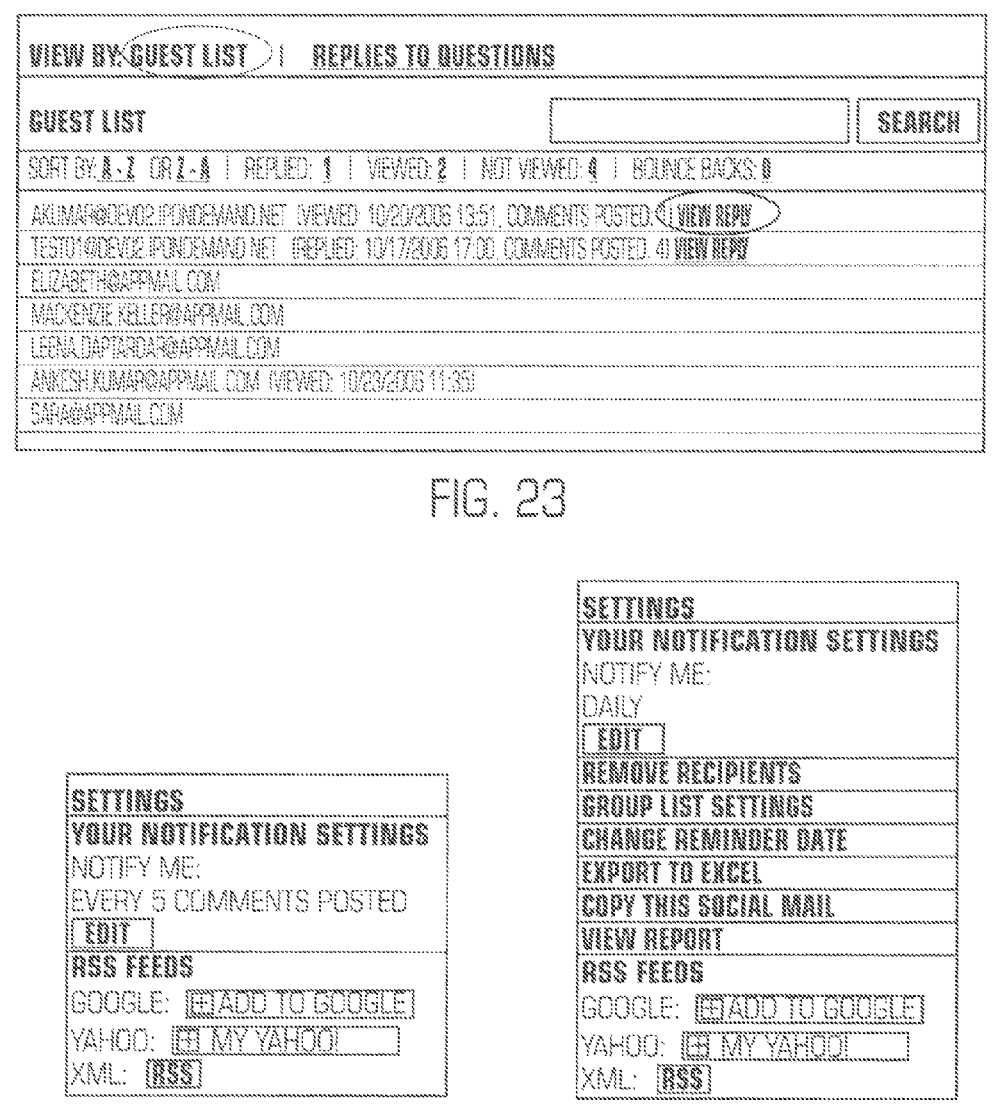

Alternatively, if the "View by: Guest List" link is selected, the section will appear as shown in FIG. 23, so as to reveal all guest names and if they replied to the SocialMail. If they have replied, a "view reply" link will be associated with their name, and this link can be selected to view their reply.

SocialMail View—Discussion Tab—Functionality

In the Discussion tab view of a SocialMail (See FIG. 17), the sender (originator) and all recipients of the SocialMail will be presented with a "Settings" window, although the features of the Settings window will be different for the sender as compared to the recipients.

Settings—Recipient

The recipient's Settings window (See FIG. 24) as it would appear in the Discussion tab view of a SocialMail is shown. Using this window, the recipient can select the appropriate link to RSS feed the discussion to an RSS reader such as a desktop, Google, or Yahoo reader and change also notification settings, i.e., frequency of notification of message postings by others, by selecting "Edit" for Notification Settings.

Settings—Sender

The sender's Settings window as it would appear in the Discussion tab view of a SocialMail is shown in FIG. 25. It includes all features of the recipient's Settings window as just described, and includes additional selectable features that allow the sender to manage the SocialMail discussion and the data generated as part of the SocialMail discussion.

It will be recognized by those of ordinary skill in the art that the additional Settings features available to the sender include "Remove Recipients" "Group List Settings" "Change Reminder Date" "Export to Excel" "Copy this SocialMail" and "View Report," each of which is described in further detail below.

Figure 26:
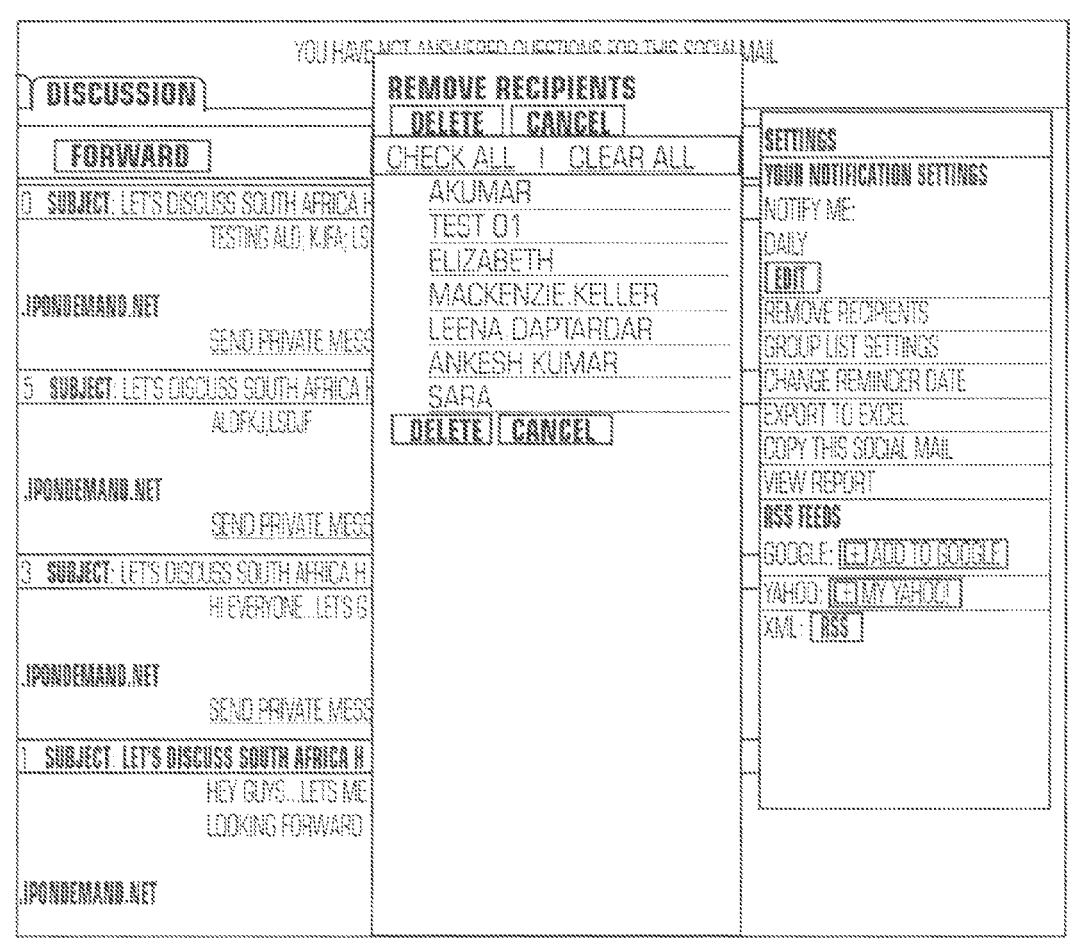

Remove Recipients—selection of the Remove Recipients buttons initiates a pop up (an example user interface is shown in FIG. 26) wherein the sender can delete certain recipients from the SocialMail, based upon their request or in response to an undelivered bounce back of the original SocialMail.

Figure 27:
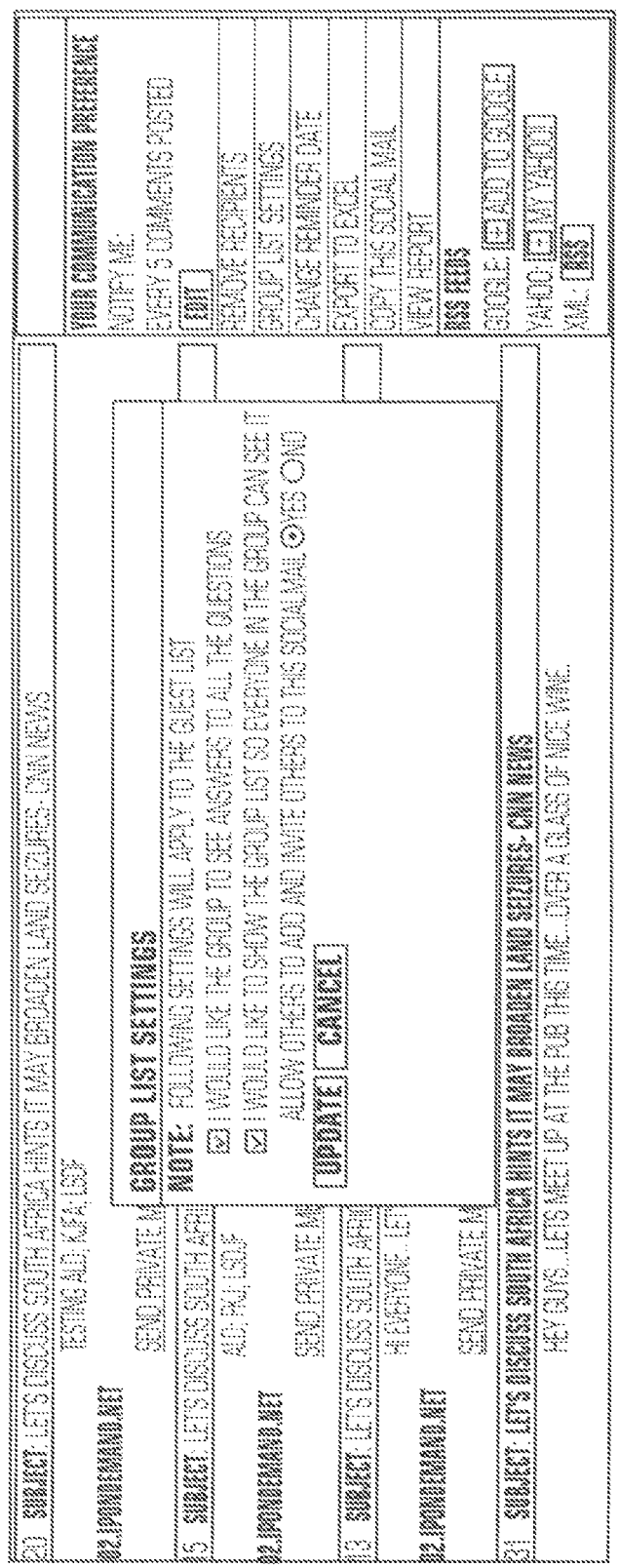
FIG. 27 illustrates an example of a group list settings user interface of the collaboration system.

Group List Settings—selection of the Group List Settings button initiates a pop up window (shown in FIG. 27) in which the sender can change recipient options such as change whether or not the recipients can view the responses of other recipients to the SocialMail questions, whether or not the recipients can see the list of other recipients, and whether or not the recipients can invite others into the SocialMail discussion (i.e., forward the SocialMail). After changing these settings, the sender selects the "Update" button to associate the new settings with the SocialMail.

Change Reminder Date

Figure 28:
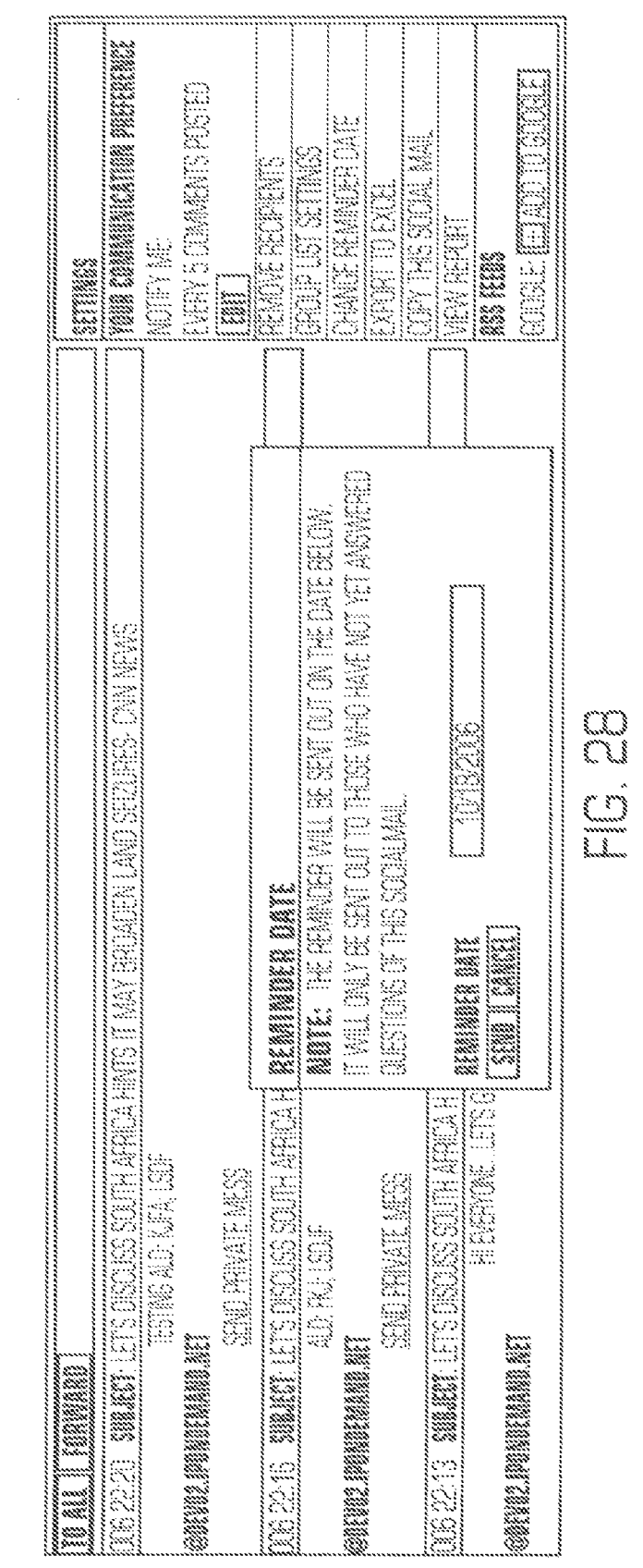

Selection of the "Change Reminder Date" button initiates a pop up window (See FIG. 28) in which the sender can change (or set) the date on which a reminder e-mail will be sent to recipients who haven't responded to the original SocialMail.

Export to Excel

Figure 29:
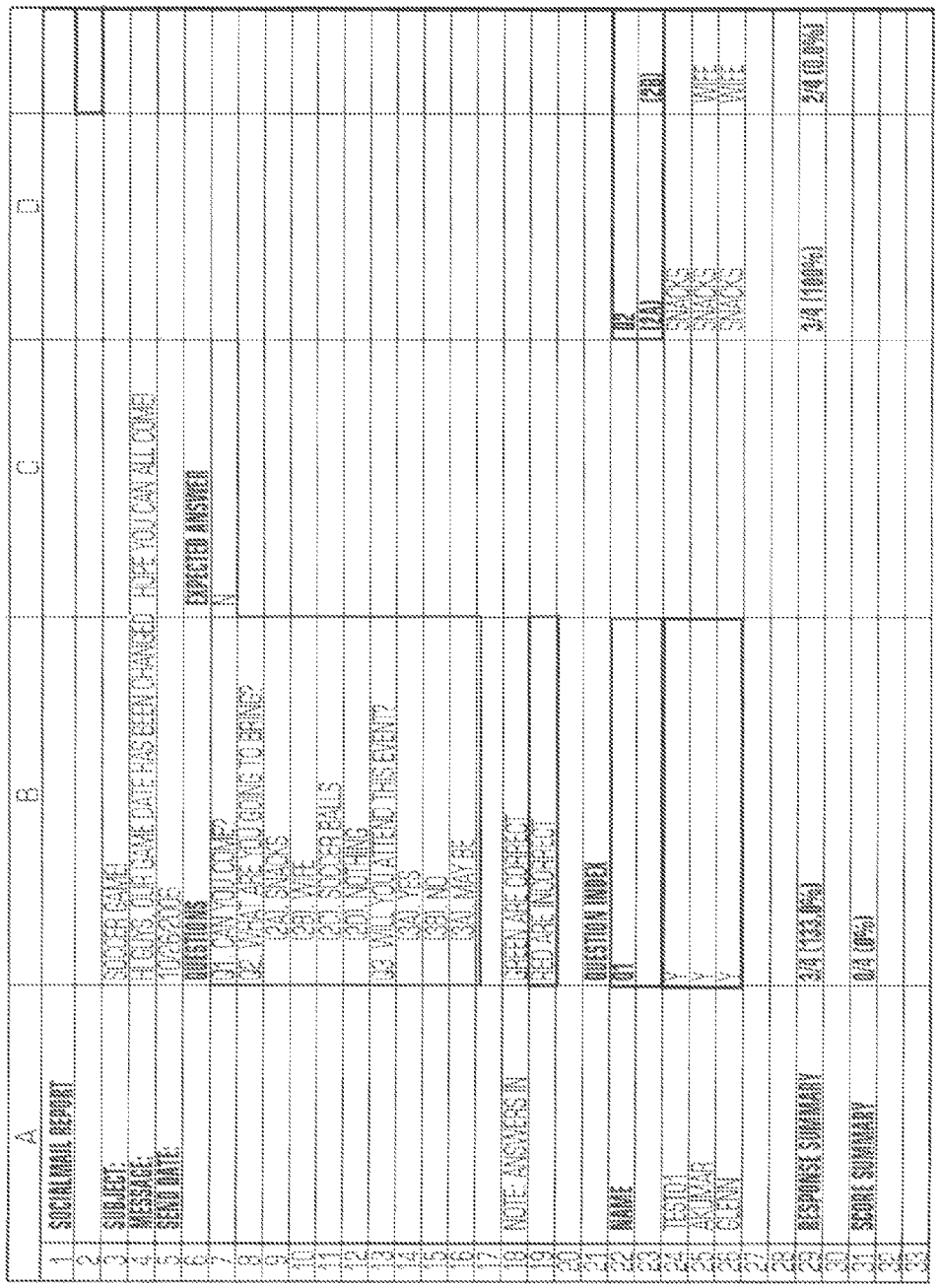
FIG. 29 illustrates an example of an exported Excel output of the collaboration system.
Figure 30:
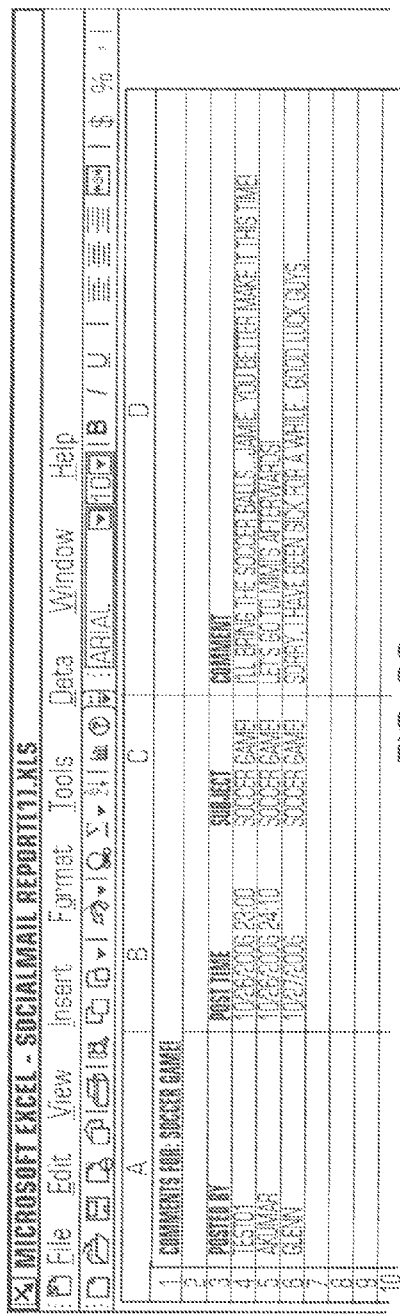
FIG. 30 illustrates another example of an exported Excel output of the collaboration system.

Selection of the "Export to Excel" button will push all comments and responses to questions (if there were any in that particular SocialMail) into an excel spreadsheet saved as part of the sender's SocialMail account or elsewhere as specified by a user (e.g., a conventional operating system pop up window can be used to request a save location for the file). An example of such a spreadsheet file is shown in FIGS. 29 and 30) and described below.

Sheet one (FIG. 29): Shows subject, message, send date, and questions in SocialMail. Answers to questions and the names of the people who responded are at the bottom. Sheet two (FIG. 30): Shows all comments that were posted on Discussion Tab.

Copy this SocialMail

Selection of the "Copy this SocialMail" button will cause the entire SocialMail and all response and other data associated with same to be copied and saved to a location in the sender's SocialMail account (e.g., in a Draft Folder) or elsewhere as specified by the sender.

View Report

Figure 31:
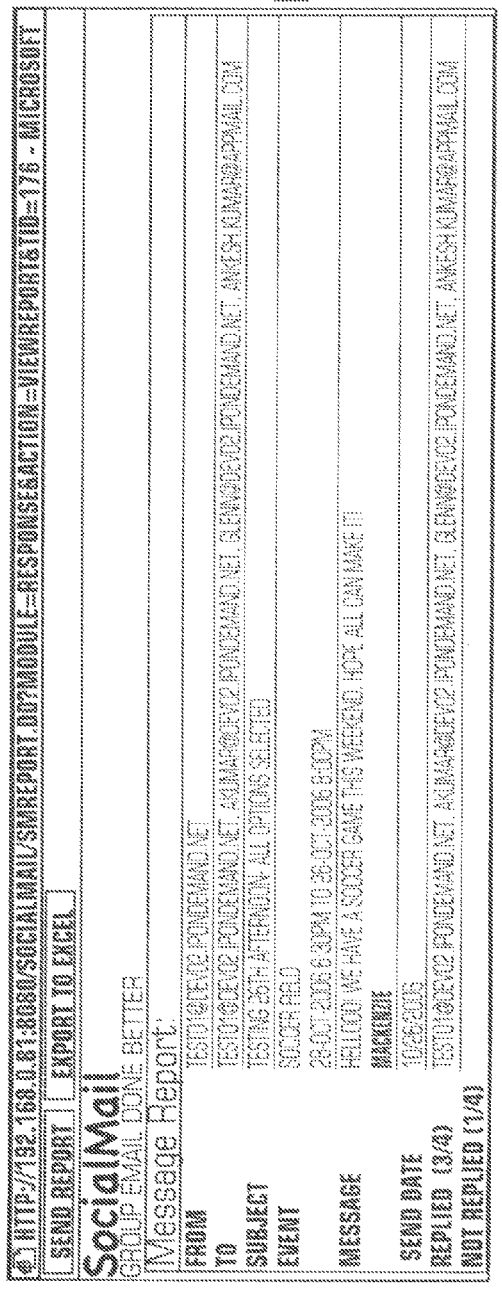
FIG. 31 illustrates an example of a view reports user interface of the collaboration system.
Figure 32:
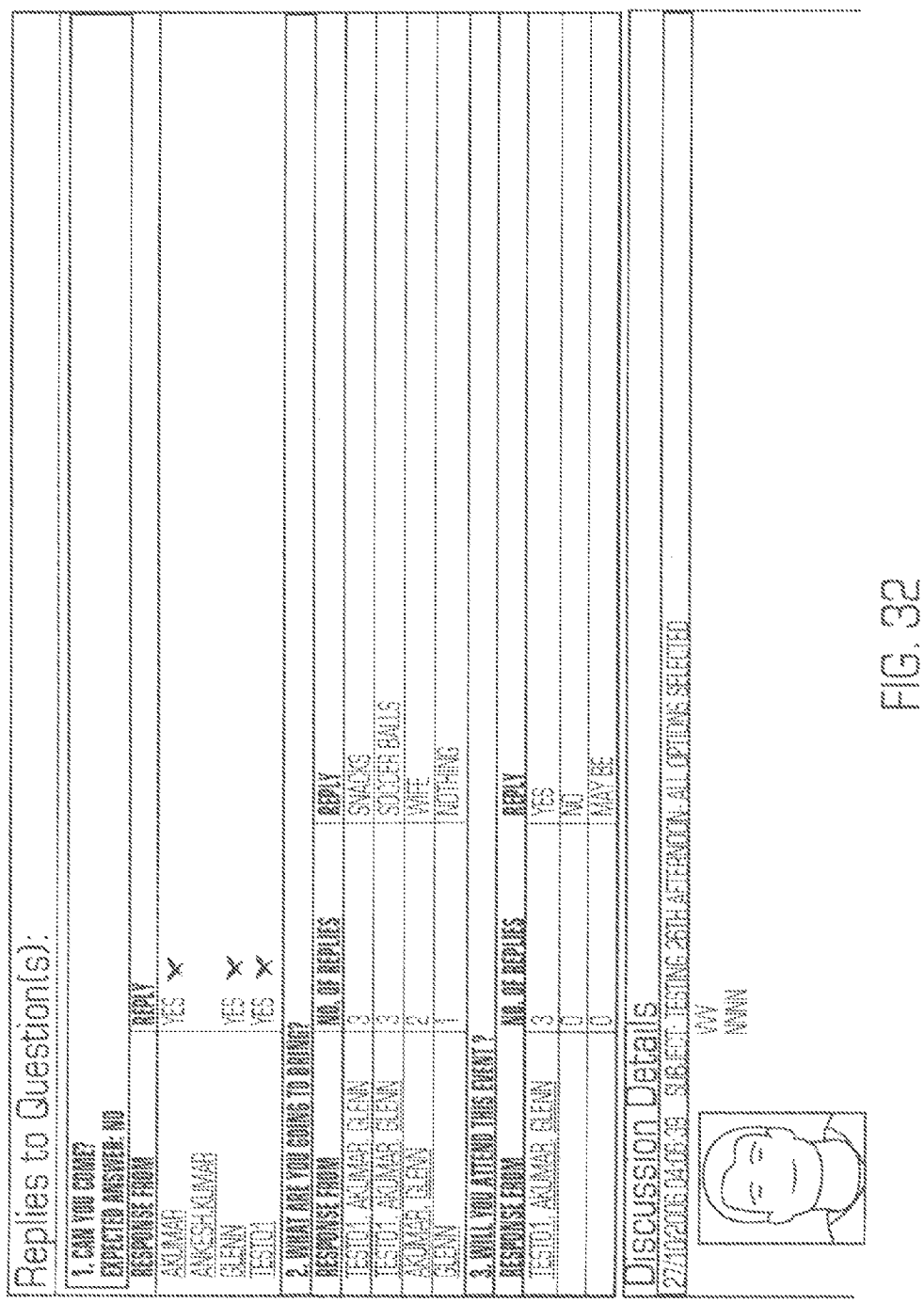
FIG. 32 illustrates an example of a report of the collaboration system.

Selection of the "View Report" button will result in the sender being presented with a status report concerning the SocialMail in a pop up window as shown in FIGS. 31 and 32, including the responses to the questions in the SocialMail. It will also show all sender and recipient posted comments with the poster's avatar associated therewith.

Address Book

Figure 33:
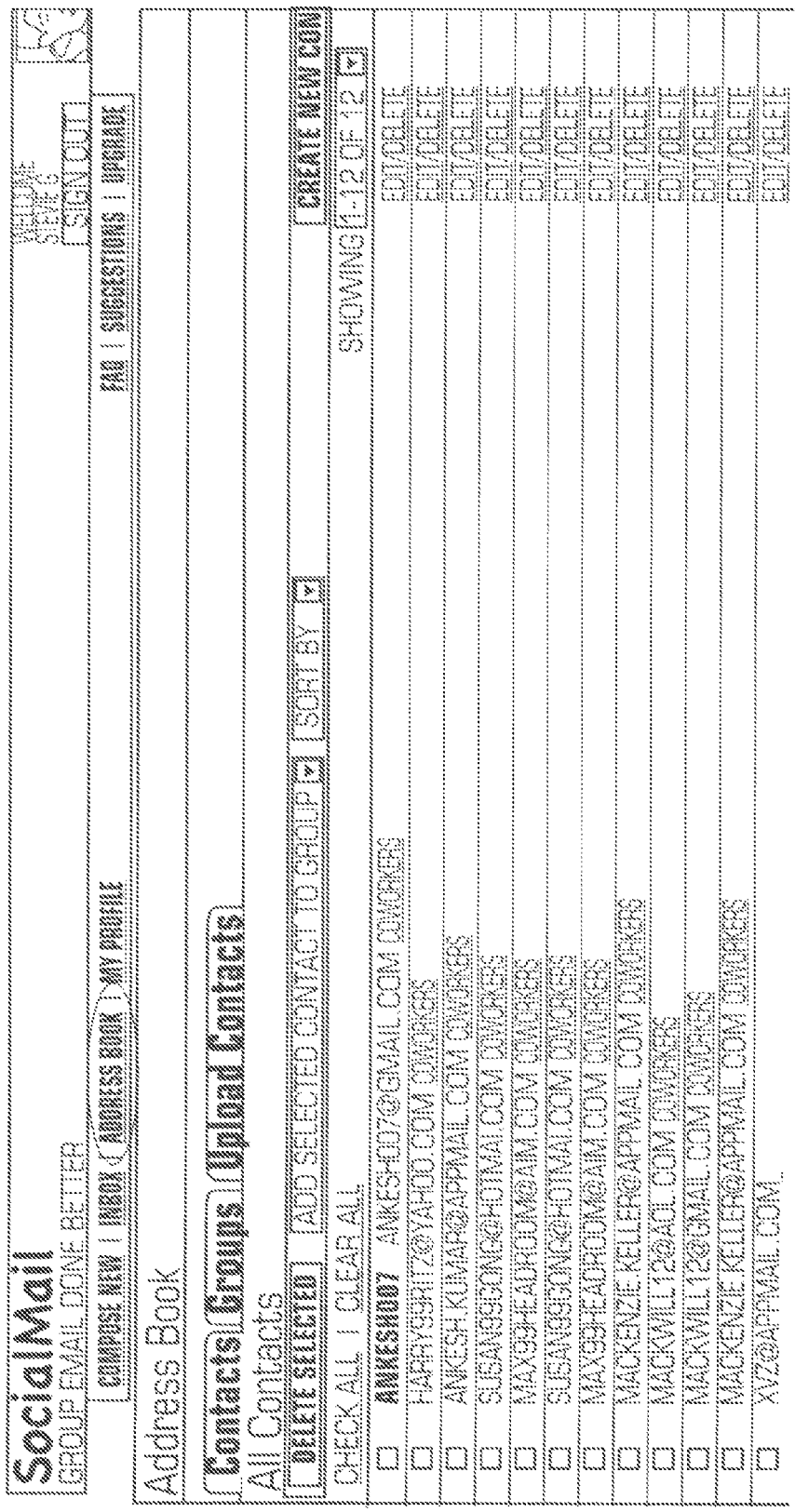
FIG. 33 illustrates an example of an address book view of the collaboration system.

Similar to a Yahoo, Hotmail, Gmail account, the system includes an address book. It consists of three tabs—Contacts, Groups and Upload Contacts as shown in FIG. 33. The Contacts tab view, showing all contacts in the users address book and in which groups if any each contact belongs. The user can add a new contact, delete and edit manually from this tab as will be readily apparent to those of ordinary skill in the art.

Add/Create New Contact

Figure 34:
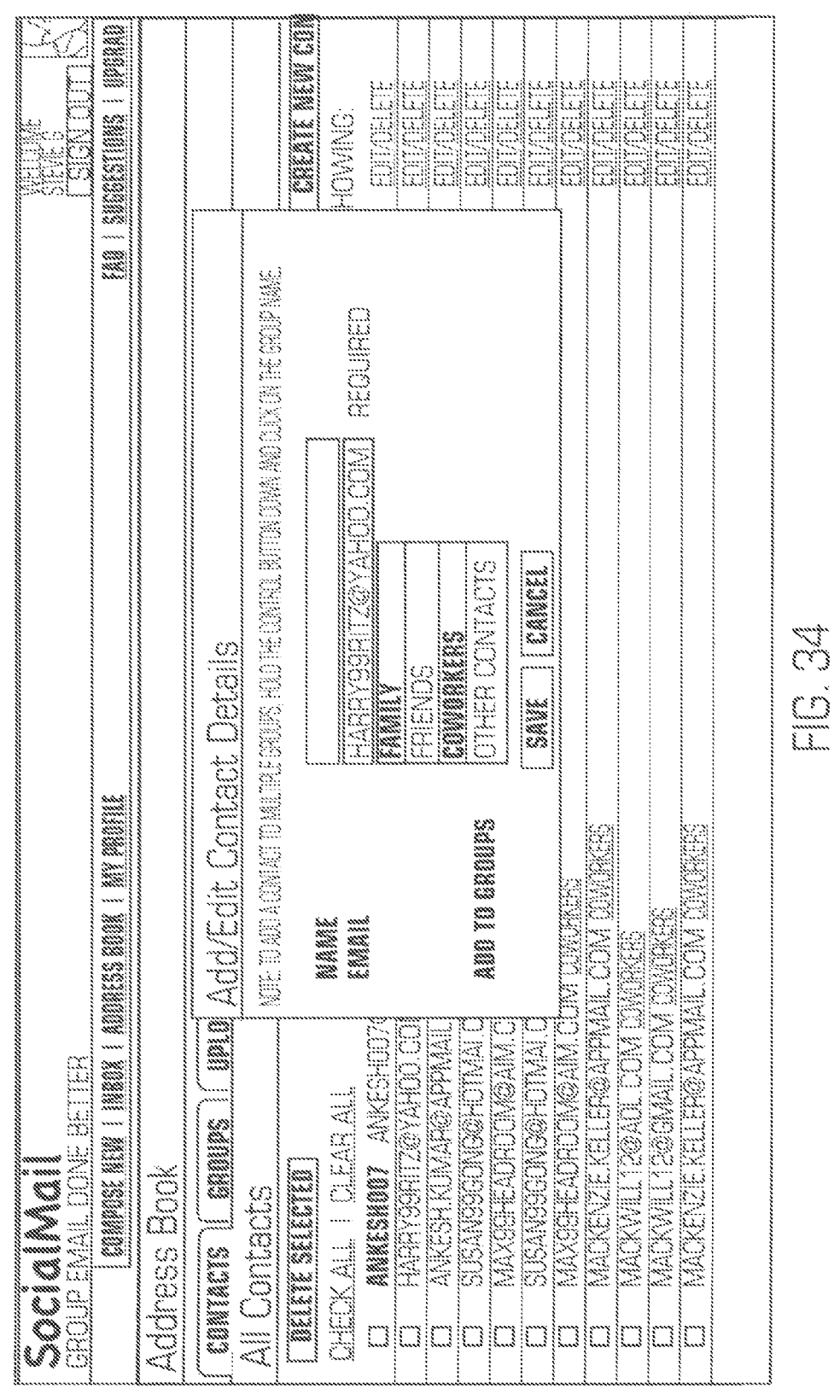

User selection of the "Create New Contact" will initiate a popup window (an example user interface is shown in FIG. 34) that will prompt the user to add the name, address, and to select the group(s) if any in which the new contact is to be included.

Groups Tab

Figure 35:
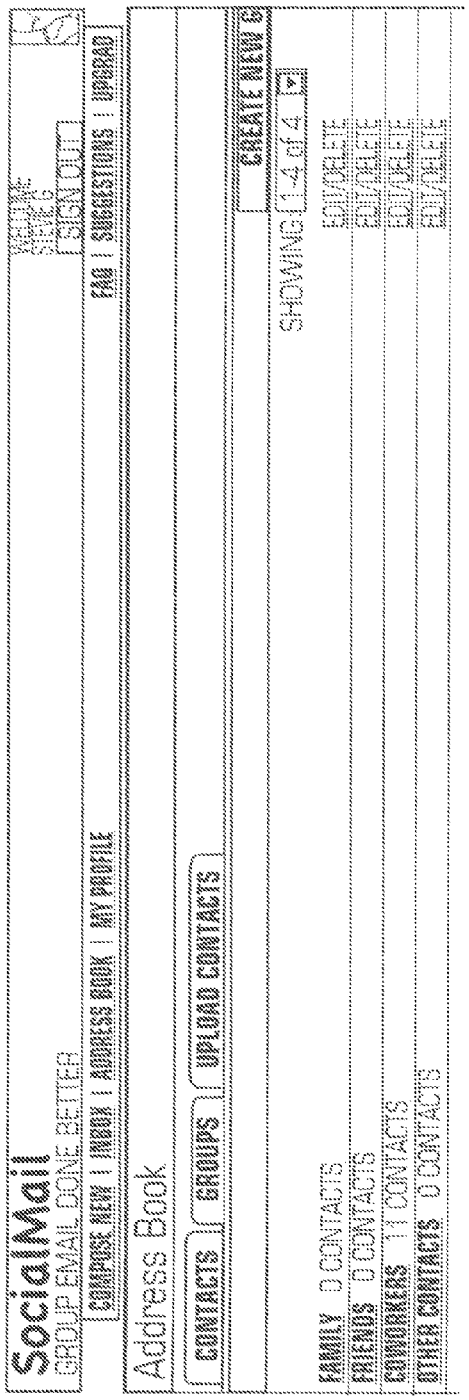
FIG. 35 illustrates an example of a user interface of a groups tab of the address book shown in FIG. 33.

The Groups tab view of the address book (an example user interface is shown in FIG. 35) is configured to allows a user to manage his/her contacts with respect to the groups in which each contact belongs and/or to establish new groups. SocialMail provides each user with 4 basic default groups (Friends, Family, Co-workers, and Other). The user can assign each contact to one or more of these groups, or delete/edit these groups or add a new group by selecting the "Create New Group" button (see below).

Add a New Group

Figure 36:
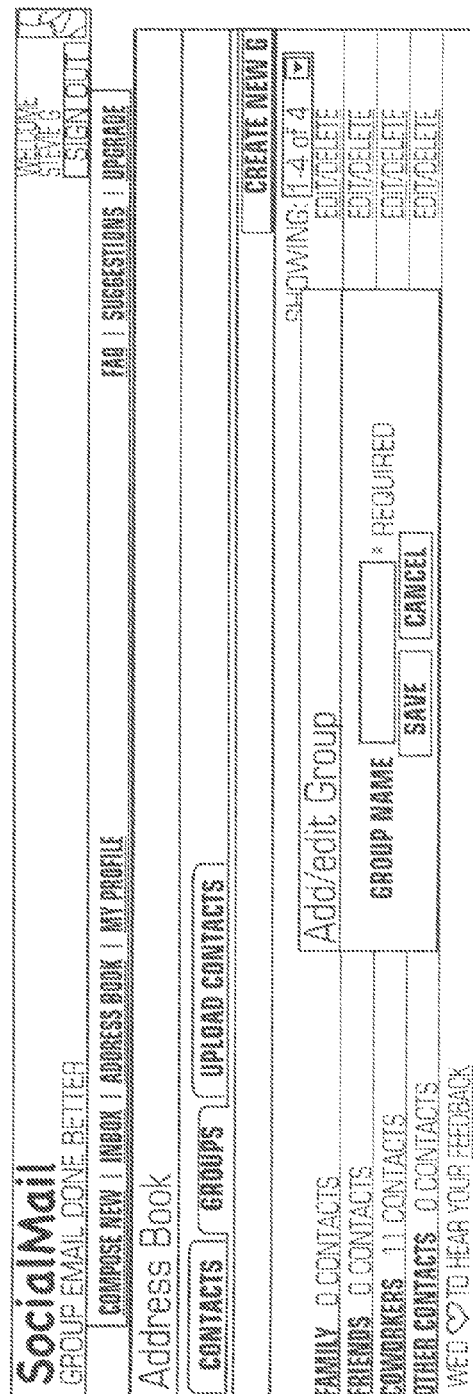
FIG. 36 illustrates an example of a add new group user interface of the groups tab of the address book shown in FIG. 33.

When the user selects the "Create New Group" button, a popup window (an example user interface is shown in FIG. 36) to complete this action is presented by which the user can add and save the new group.

Upload Contacts Tab

Figure 37:
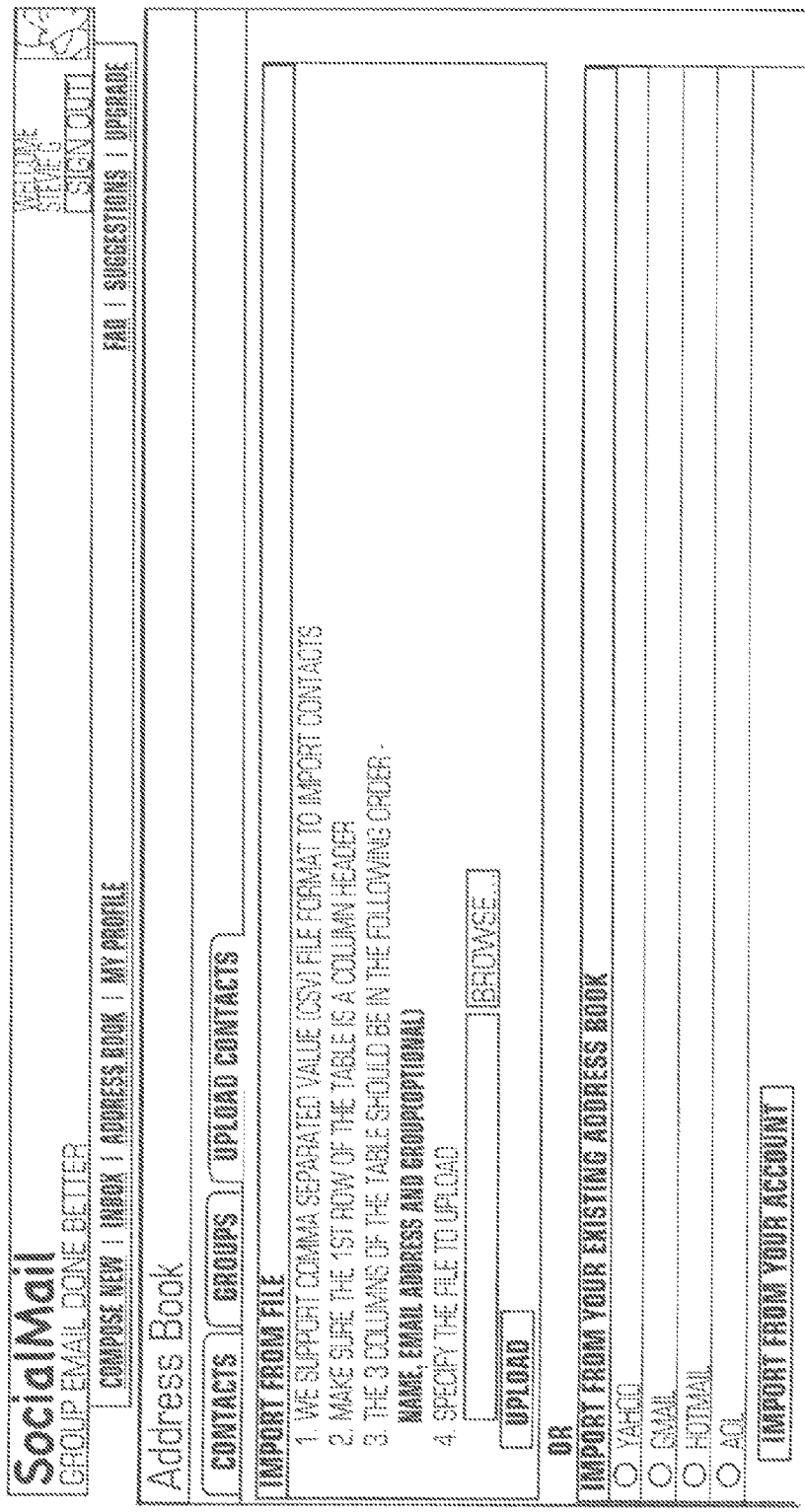
FIG. 37 illustrates an example of a user interface of an upload contacts tab of the address book shown in FIG. 33.

A user selects the "Upload Contacts Tab" (See the example user interface in FIG. 37) to import contacts from another email client (i.e. yahoo, hotmail, MSN, Gmail, etc.) In the illustrated embodiment, this is accomplished by uploading a specified CSV file to the user's SocialMail account or, the user can choose an existing address book from the displayed list (e.g., Yahoo, Gmail, Hotmail, AOL in the illustrated example).

Figures 38, 39:
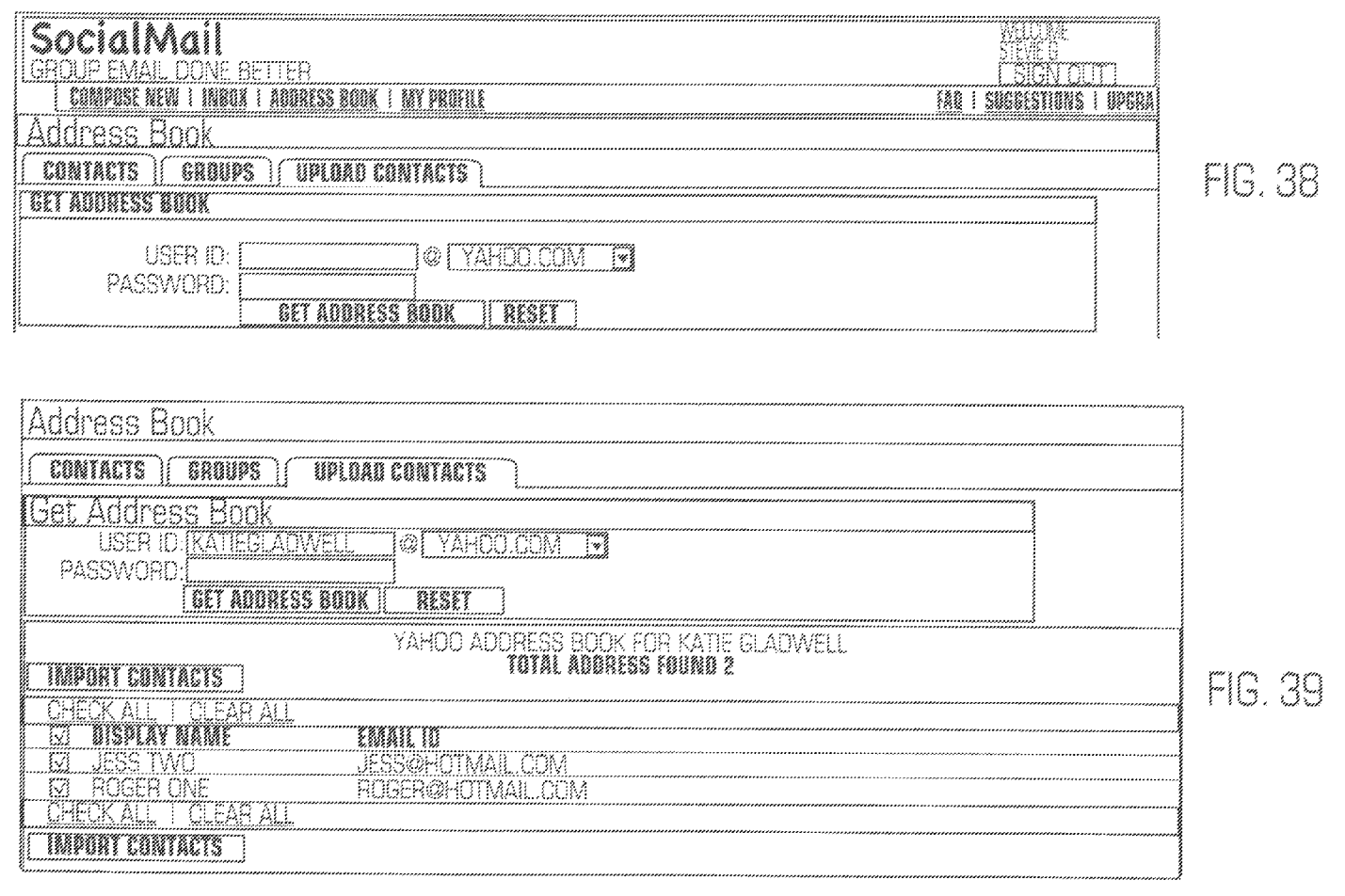

In the latter case, where the user selects an existing e-mail account from which the address book is to be uploaded, the user will prompted as shown in FIG. 38 to enter his/her user ID and password for the indicated account and then select the "Get Address Book" button so that the system of the present invention can access the address book of the indicated account and save same to the user's SocialMail account.

Preferably, as shown in FIG. 39, the user is then presented with a list of all contacts in the selected account, and the user can select only those specifically desired to be added to his/her SocialMail account, after which the user selects the "Import Contacts" button to complete the process.

My Profile

Figure 40:
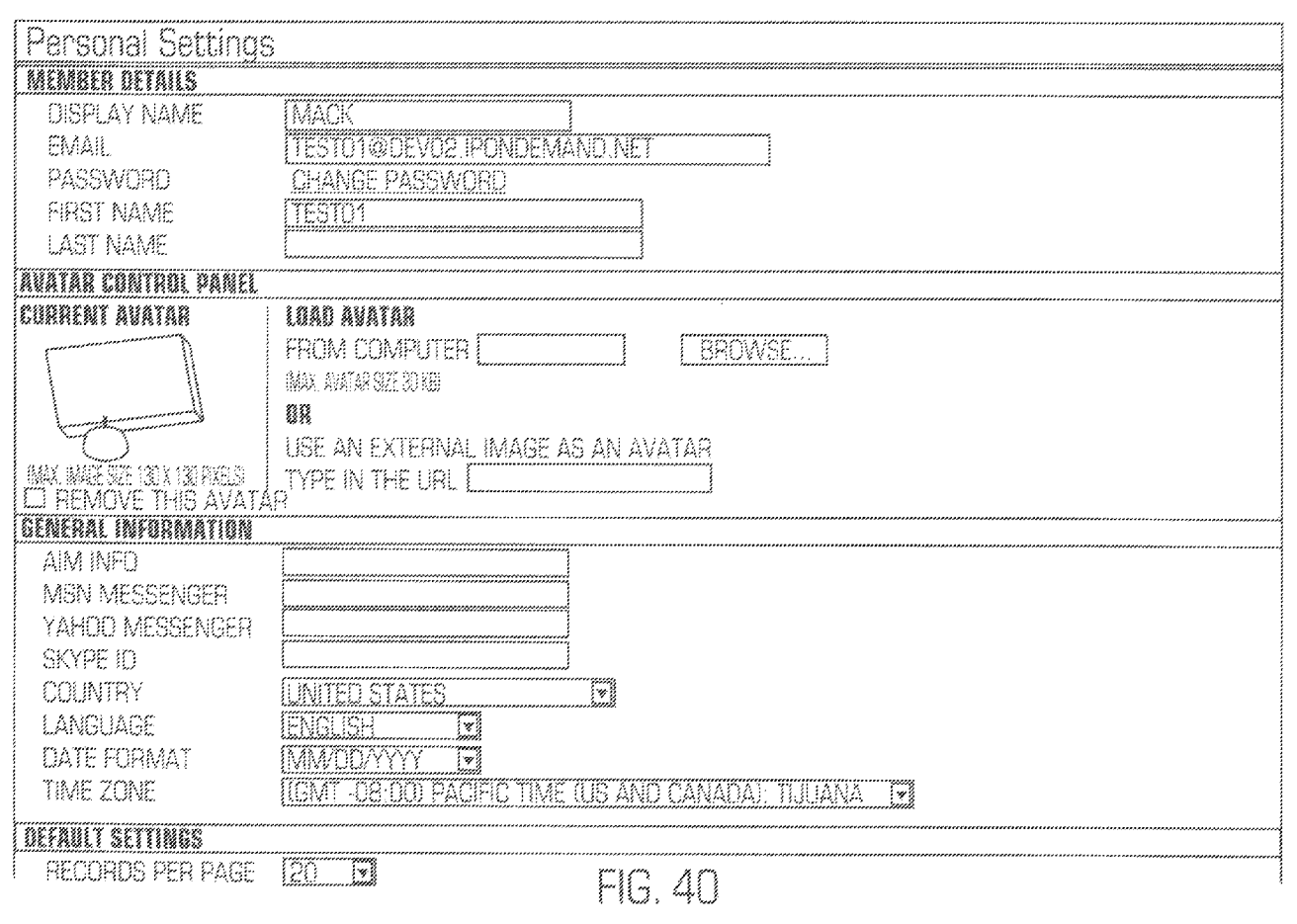

When a registered user is logged in to the SocialMail system, they can select a "My Profile" button/link to update their profile and preferences as shown in the "Personal Settings" page shown in FIG. 40. Using this feature, a user can change his/her password, upload an avatar, and add IM, Skype, Yahoo, MSN ID's so that when they post a comment in the discussion tab, they can begin a chat with any other participant via the above methods.

Figure 41:
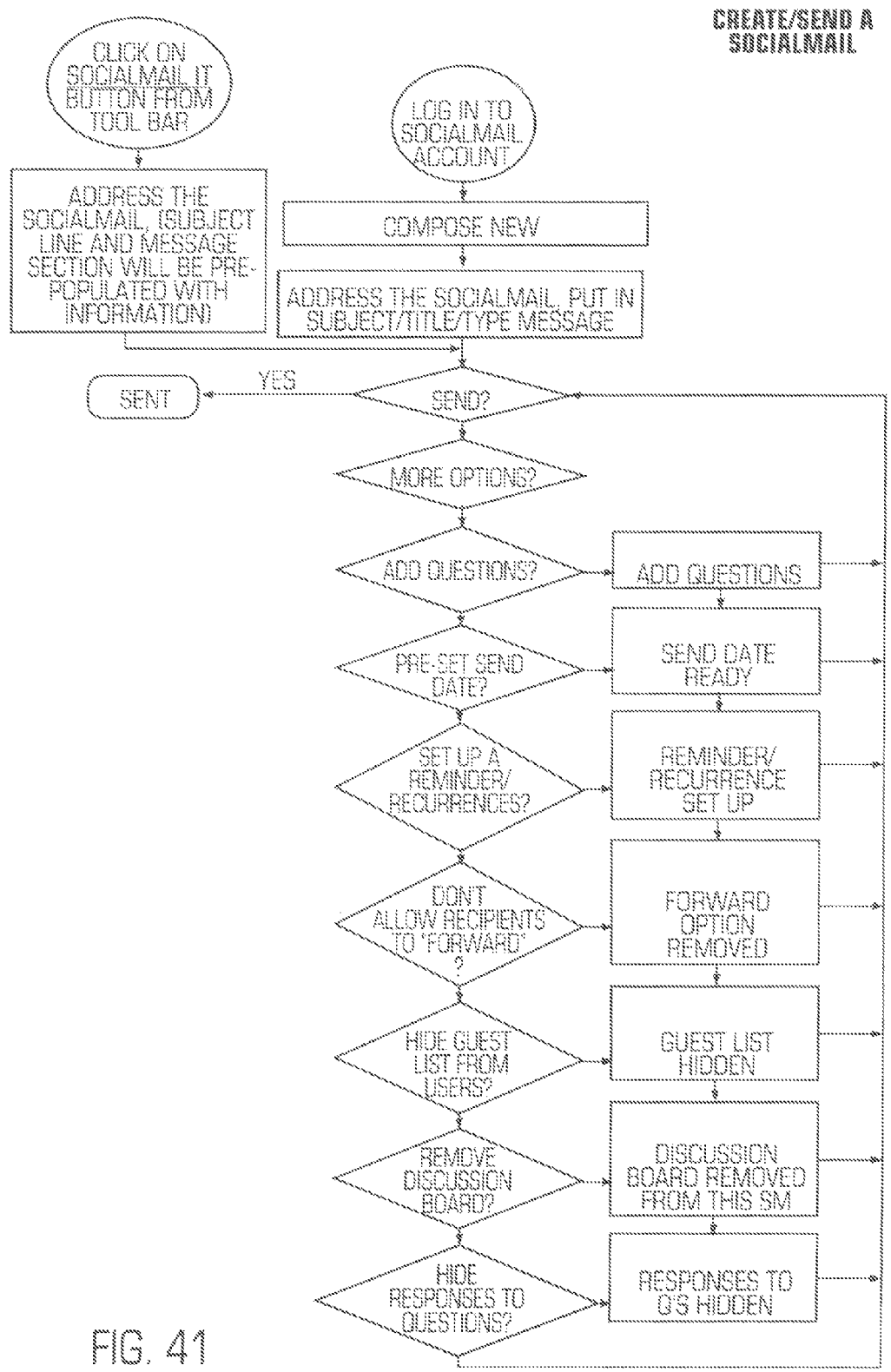
FIG. 41 is a flowchart of a method for creating/sending a new collaboration message.
Figure 42:
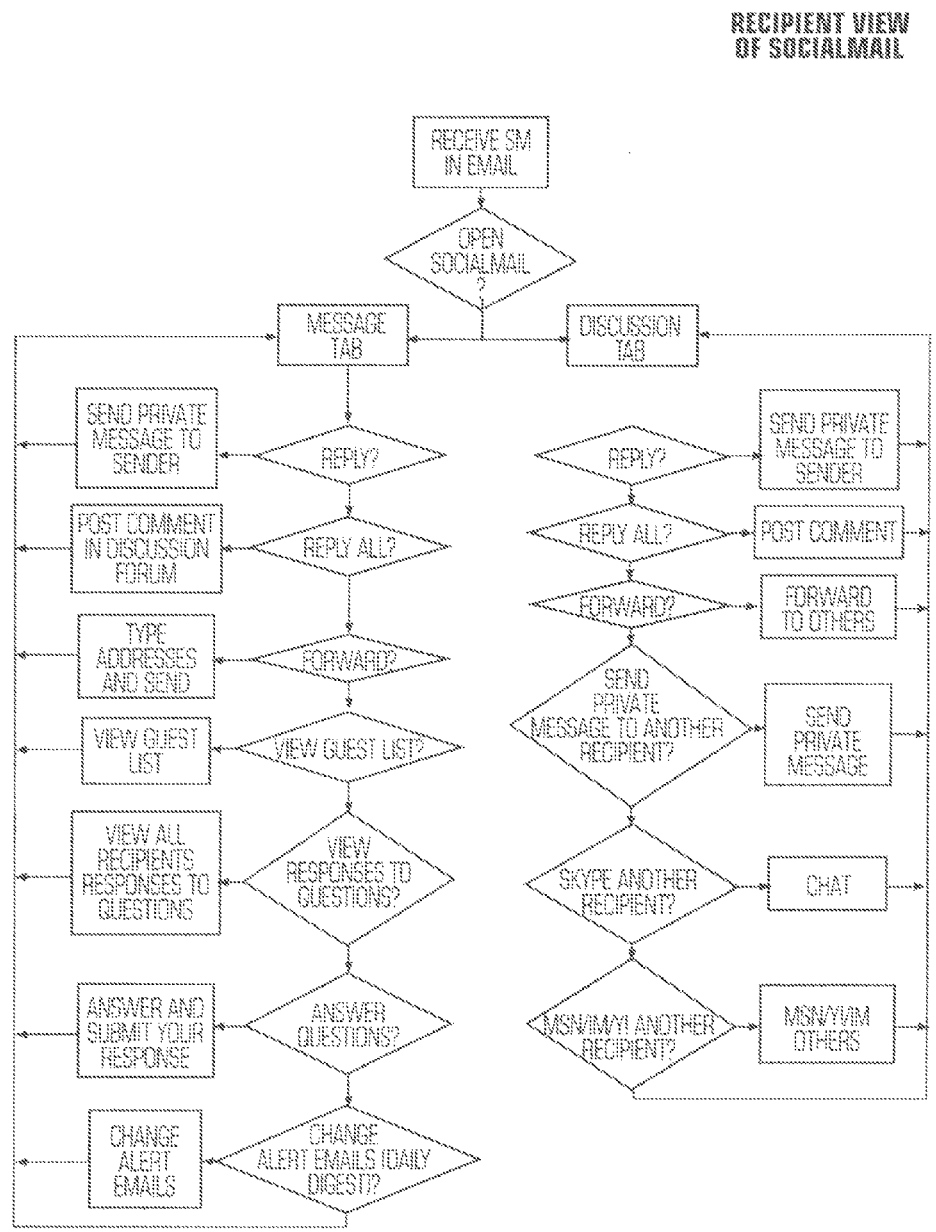
FIG. 42 is a flowchart of a recipient's view of a new collaboration email message.
Figure 43:
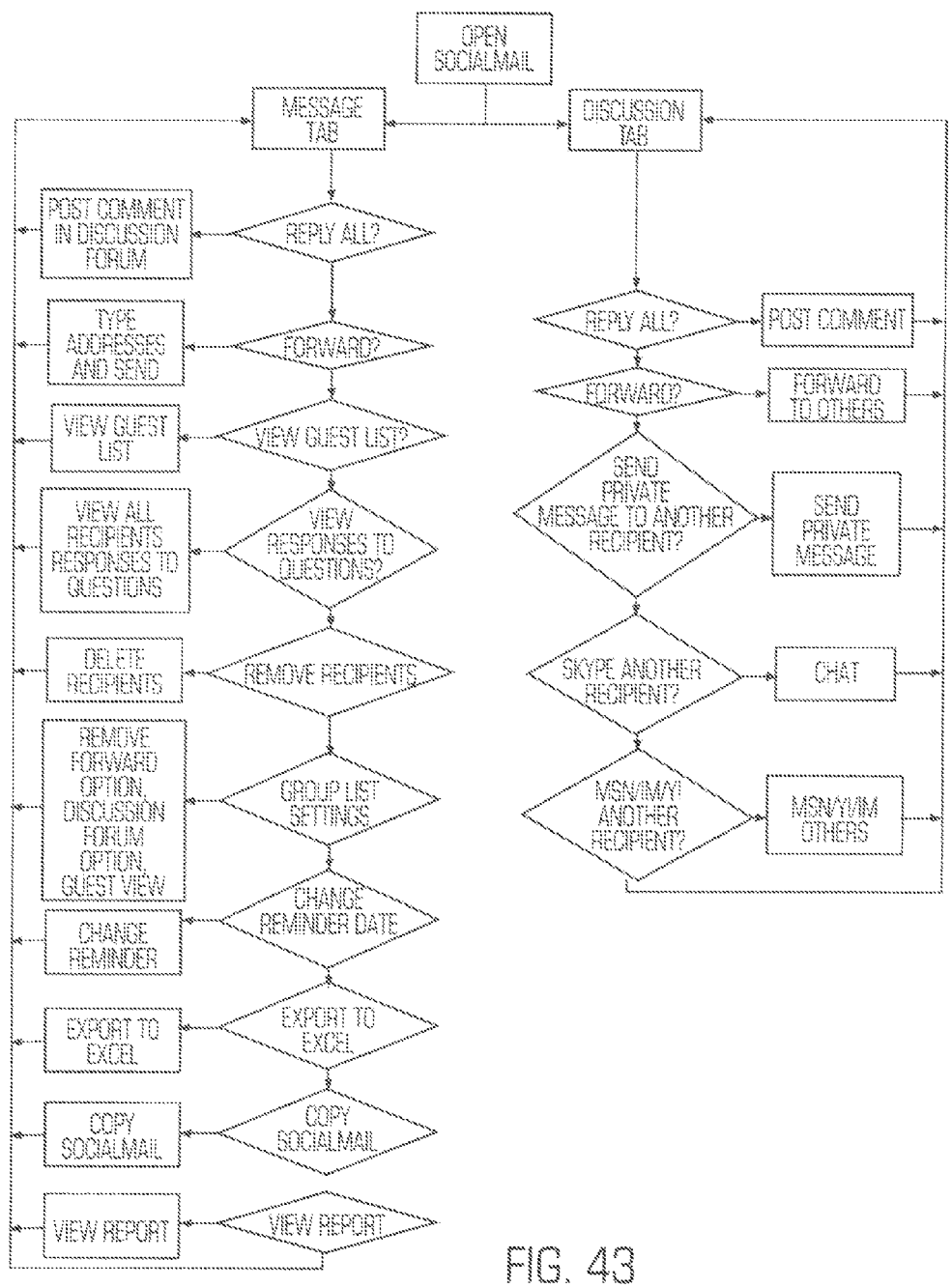
FIG. 43 is a flowchart of a sender's view of a new collaboration email message.

The above processes are also shown below in flow chart form in FIGS. 41-43 wherein SM is an abbreviation for SocialMail in these flow charts. In addition to the features set forth above, the system may also include an email and register user interface, a mechanism to add pieces of content, incorporate bookmarks and post content to other sites as will now be described in more detail.

Email and Register User Interface

Figure 44:
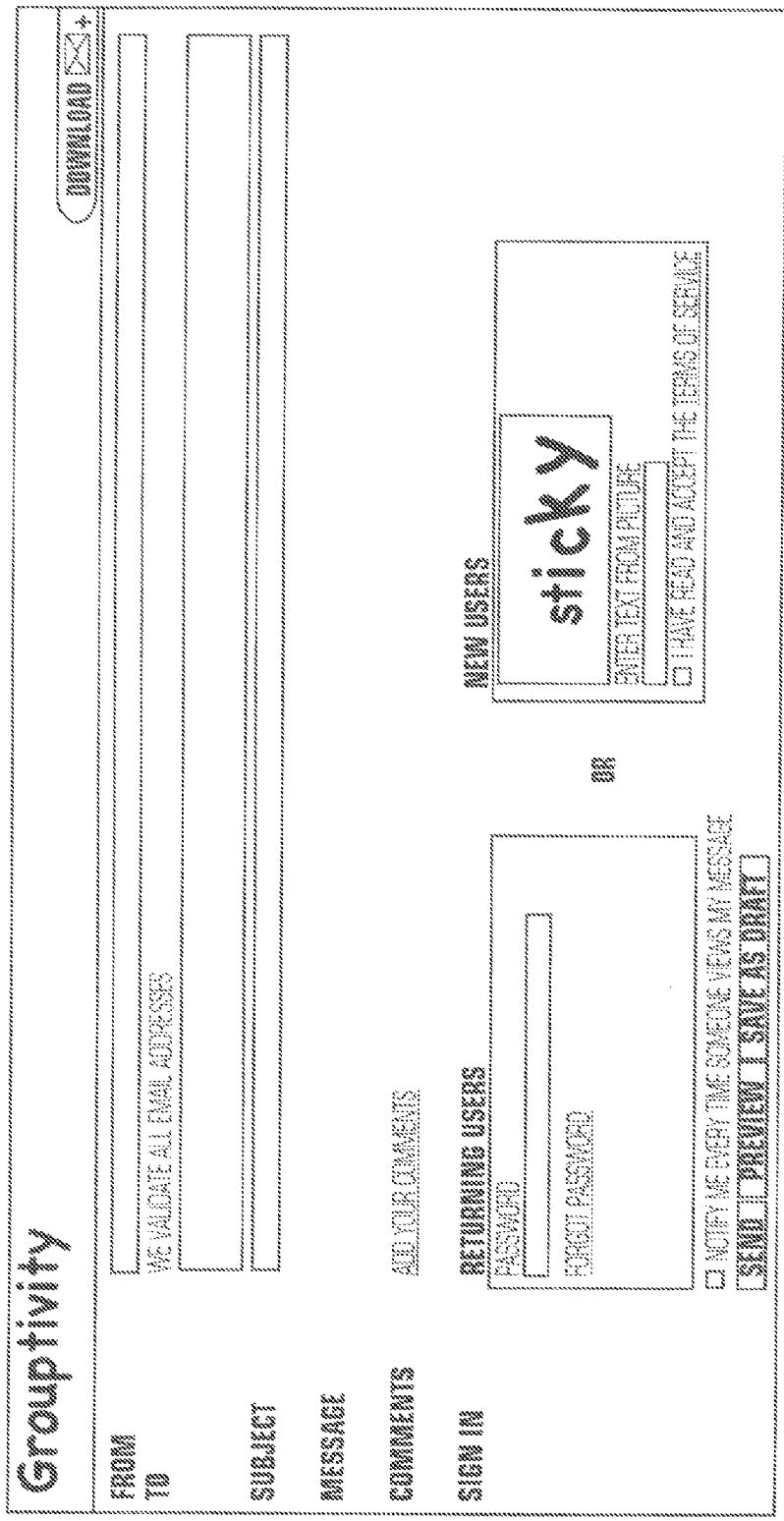
FIG. 44 illustrates an example of a email and register user interface of the collaboration system.

FIG. 44 illustrates an example of a email and register user interface of the collaboration system. The user interface shown in FIG. 44 permits a user to create a new SM message and register for a new account at the same time. It is convenient for the new user to both sign up and send out his first Email+ message on the same screen. The user interface allows the user to address the message, type in subject line and comments, while signing up as new user at the bottom. In addition, returning users that don't have a cookie on their machine can also sign in and send out a message at the same time.

Adding Additional Content

Figure 45:
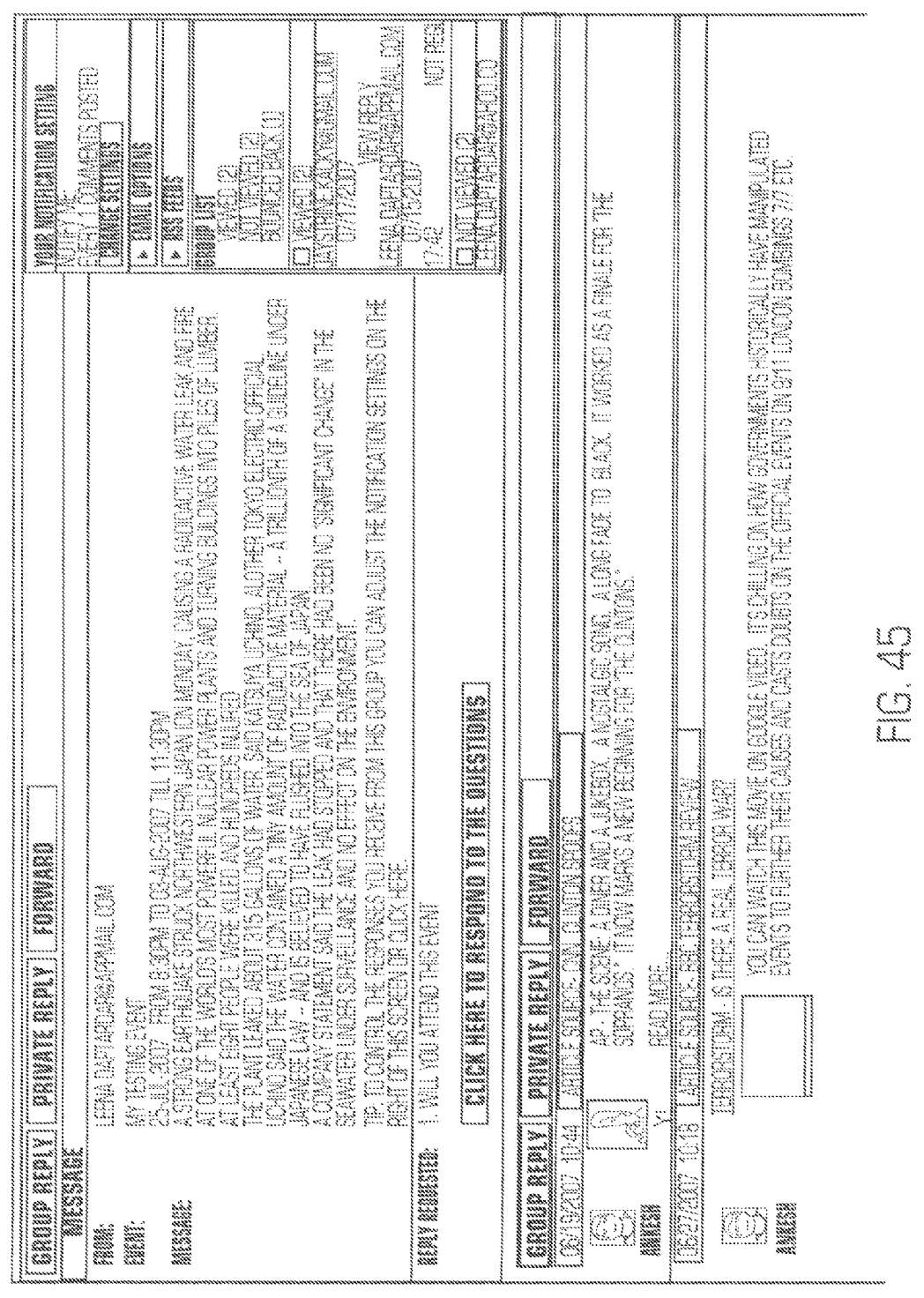

FIG. 45 illustrates an example of a user interface for adding more pieces of content to an existing thread of the collaboration system. This functionality allows all participants in the collaboration system to add other content found on the web, blogs, etc. and add it to the Email+ message discussion. The article, content, video, etc. will be posted with it's original source cited as shown in FIG. 45.

Incorporating Bookmarks

The system also permits a user to incorporate bookmarks from third party sites and products, such as delicious, blogs, travel sites, friend networks, etc., into the collaboration system. Thus, while using the collaboration system (known as Grouptivity in one implementation), users can pull information from third party sites and accounts that they are registered with. For example, a user that is registered with delicious can login to their account and pull information, articles, etc. from delicious and post them into Grouptivity. This may occur in two steps.

Figure 46:
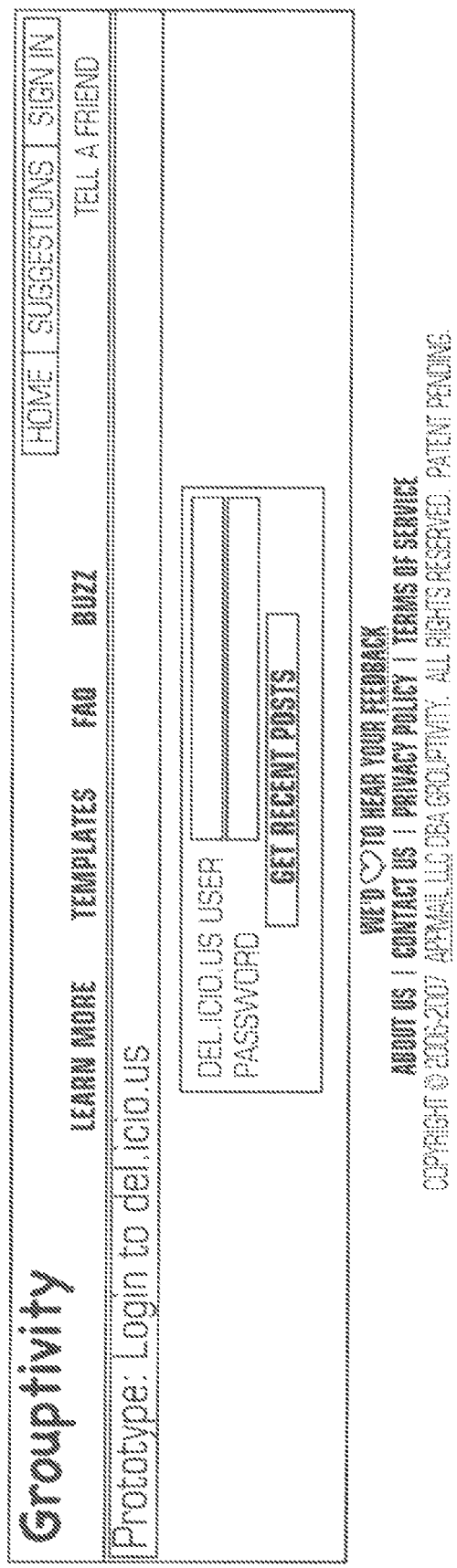
FIG. 46 illustrates an example of a user interface for incorporating bookmarks of a third party products into the collaboration system.

Step 1—From Grouptivity, user logs into third party account (See FIG. 46 for an example of the user interface for logging into the third party site).

Figure 47:
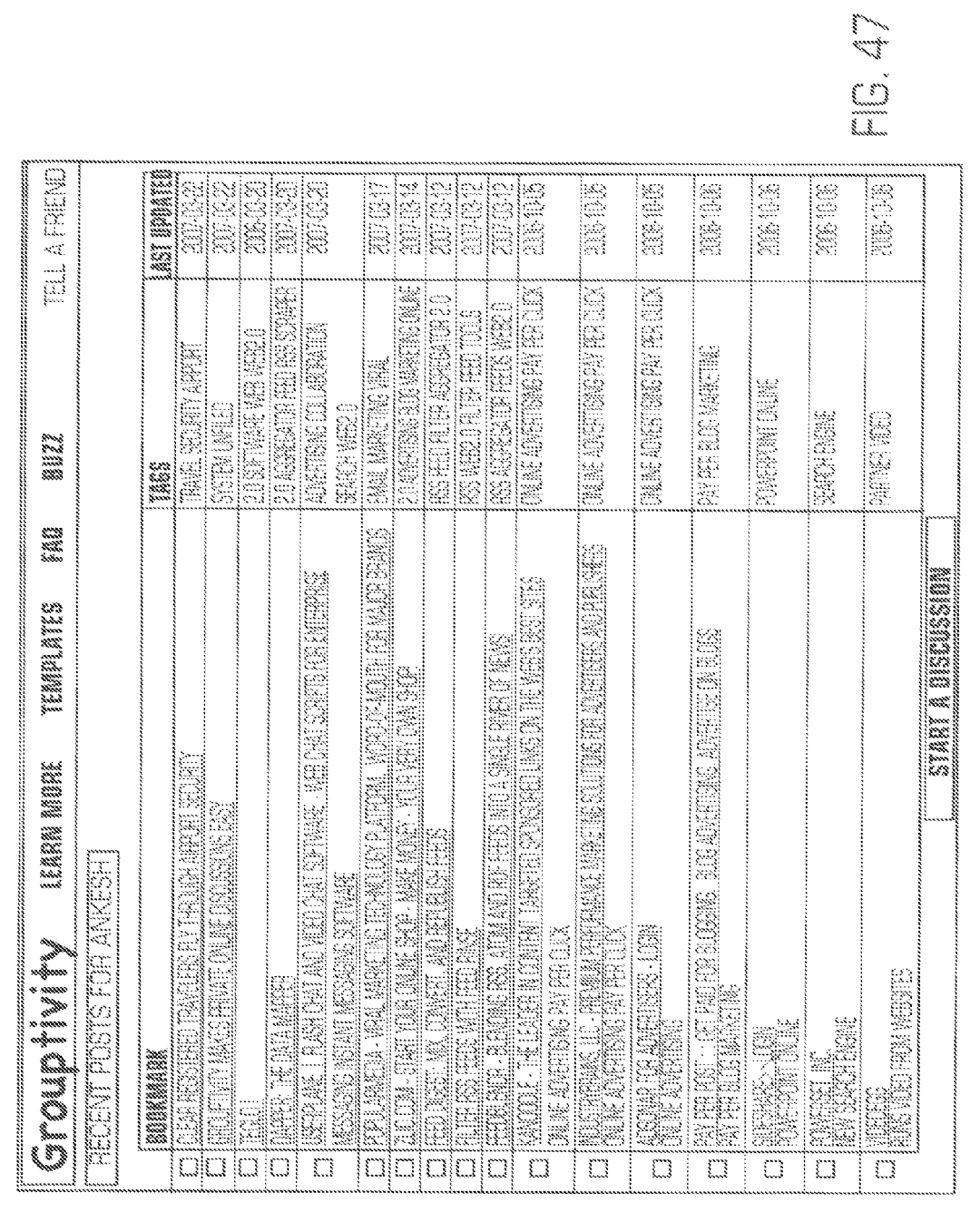

Step 2—User sees information and posts in third party account. User clicks on button to retrieve information from third party account and then, using the exemplary user interface shown in FIG. 47, the user can start a new discussion in Grouptivity on content from the third party account or the user can select specific content to add to an existing discussion in Grouptivity or, to start a new discussion on specific content from third party account.

Post Content to Third Party Site

Figure 48:
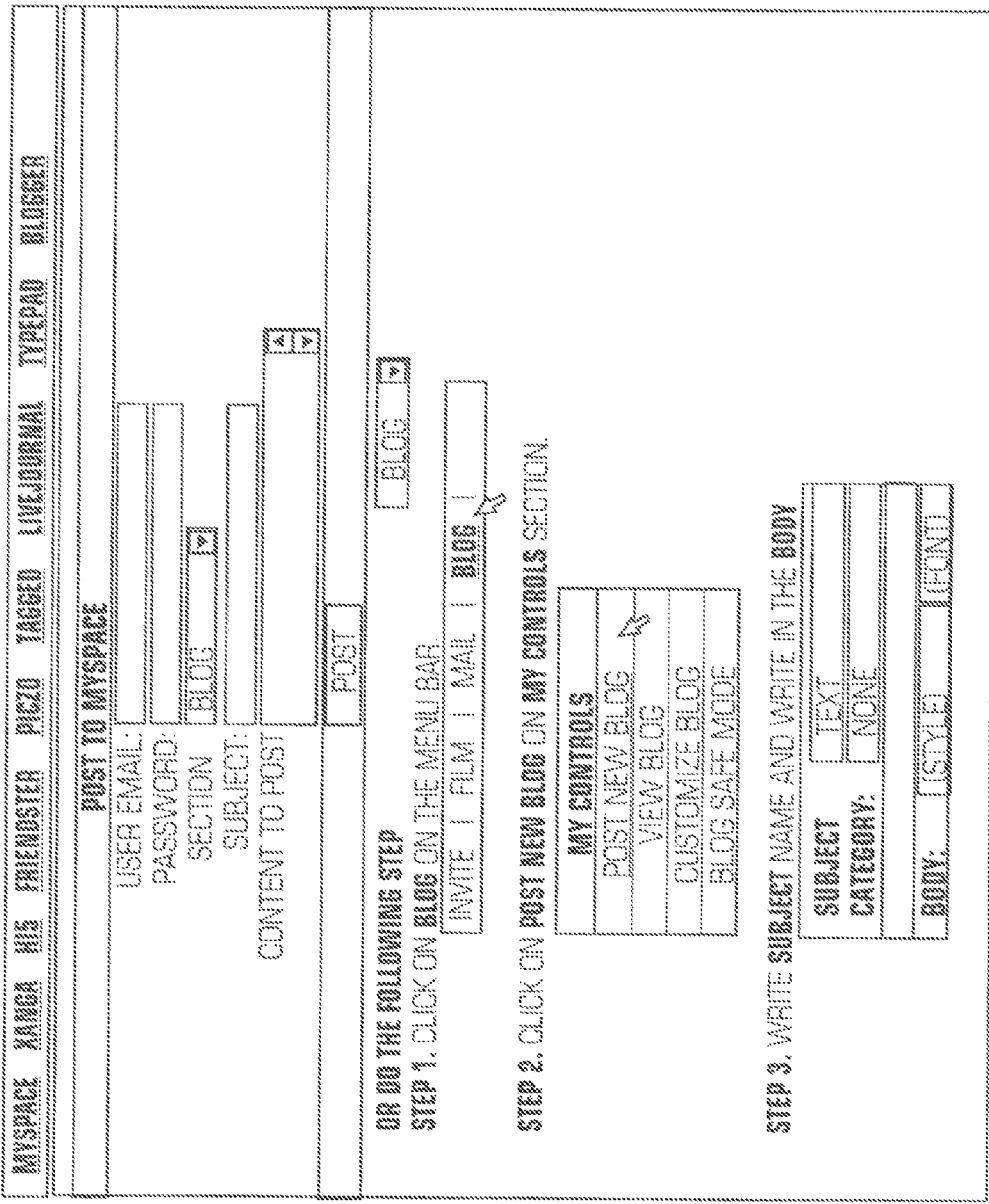
FIG. 48 illustrates an example of a user interface for posting content from the collaboration system to third party sites.

The system also permits a user to post contents from a Grouptivity discussion thread to one or more third party sites, such as blogs, social networking sites, etc. FIG. 48 illustrates an example of a user interface for posting content from the collaboration system to third party sites. Thus, while using Grouptivity, if a user has another account with a third party site (example: My Space), the Grouptivity user can post contents from a Grouptivity discussion into the third party site, blog, etc.

Partnering

The system provides a service (discussion threads with content) that behaves in particular way with respect to its partners. In particular, if a user signs up for the service through a partner, they will be a registered user of that partner (partner 1). If the same user goes to another partner's site (partner 2) and see a piece of content of interest and brings the piece of content into the service, that content will be displayed with the trade dress and associated advertising of partner 2. However, since the user was originally registered with partner 1, all of the rest of the user interface (i.e. inbox, address book, etc.), the user will see the trade dress and advertising for partner 1. Thus, in the system, the user is displayed the trade dress and associated advertising of the content provider of the associated content. If the user pulls content from a non partner, they'll be no advertising or trade dress. If there is content from multiple content providers, their can be two scenarios: firstly, the first content provider in the thread will have rights to the advertising and trade dress; secondly, no trade dress and equal share in the advertising, e.g. 5 partners at 20% each. Now, a private discussion forum of the collaboration system is described in more detail.

Figures 49, 50:
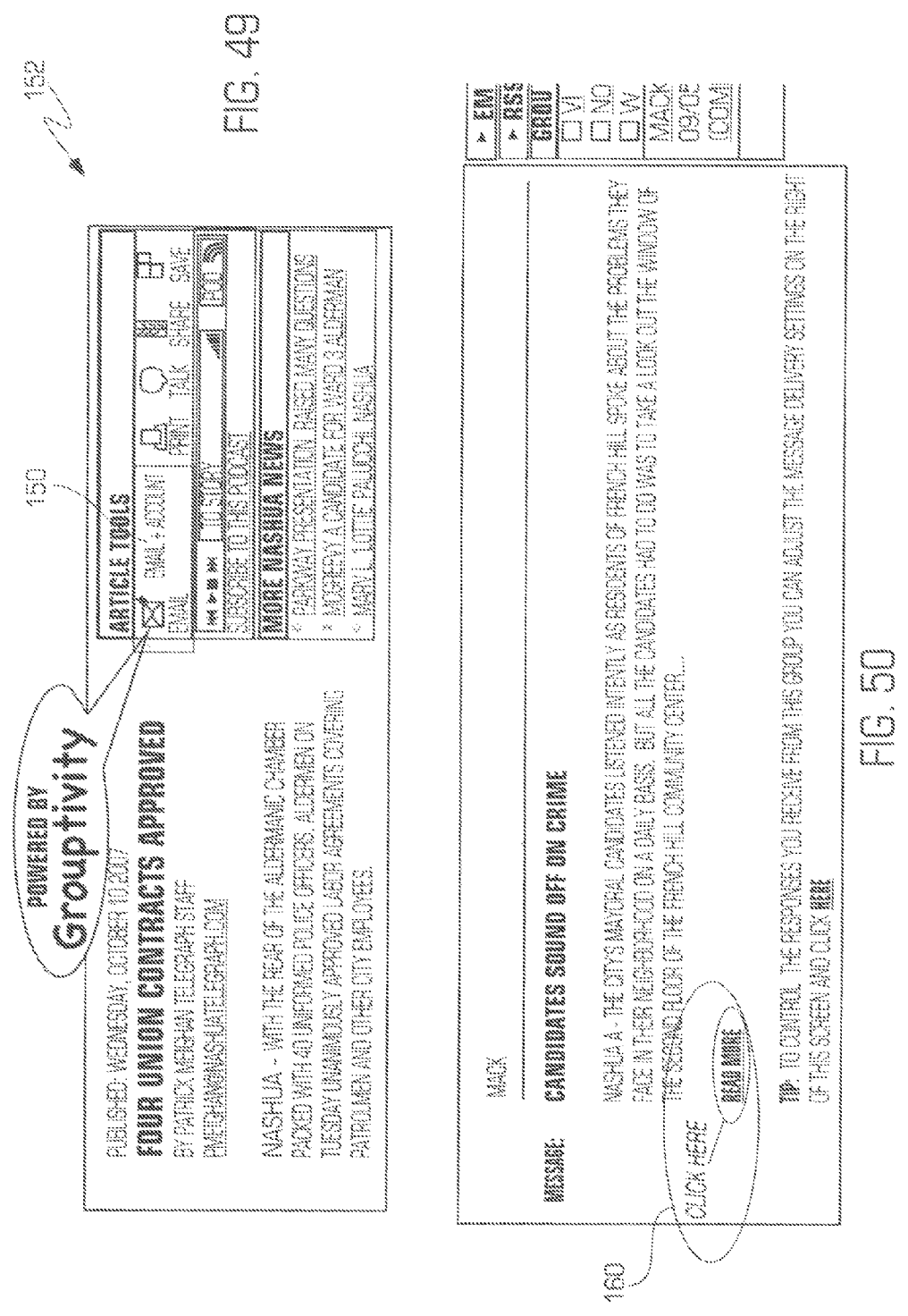

FIG. 49 illustrates an example of a private discussion forum of the collaboration system using an "email+" button 150 on a web page 152 wherein there may be a set of article tools. A typical web page may have an "email to a friend" link whereas the web page integrated with the collaboration system may include the "email+" button 150. When the user clicks on the "email+" button, the collaboration system creates an instant private discussion with selected friends (as described above) and allows all recipients to forward, post comments, and send private replies to other recipients of the private discussion group.

Figure 51:
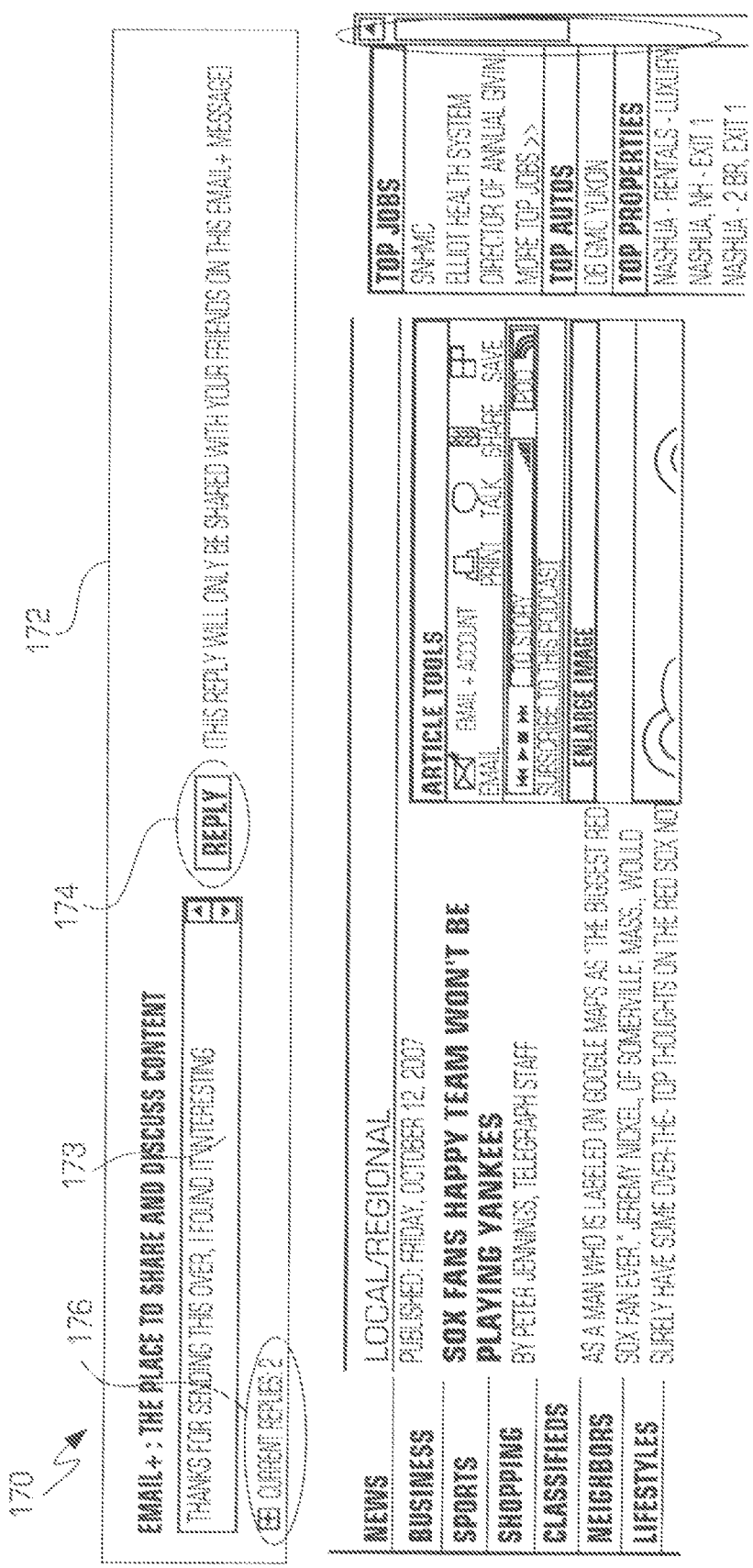
FIG. 51 illustrates an example of a post comments portion of the collaboration system.

FIG. 50 illustrates an example of a read more link 160 of the collaboration system wherein, once a recipient enters a private discussion forum, they can click on the "read more" link 160. When the user clicks on the "read more" link, the collaboration system displays a child window 170 as shown in FIG. 51 that contains the Email+ portion 172 at the top with the entire article to view below the Email+ portion 172. The child window 170 allows a user to post a comment (using a comments box 173 and a reply button 174), to scroll to view the whole article and to expand the current replies (using a current replies link 176) to see all other posted comments.

In addition to initiation of a private discussion forum (as described above with reference to FIGS. 49-51), the same mechanism and process, i.e. entering ones' email address and the email addresses of one or more friend(s) may result in the sender and/or recipient, being part of a social networking group. Participants in the social networking group, using contacts/address of users, could view other members of the social networking group and enjoy other community type services, including but not limited to sharing web content, blogs, videos, photos, etc. The social network group could be public or semi-public (i.e. users have the option to share or reveal only part of their profile or other information like content or discussions.) The purpose would be so that an entity could leverage an existing behavior to recruit members to it's network or community.

The collaboration allows a user to take a subset of data and create a public record of it and thus allows people to make, what is already bookmarked through Grouptivity, 'public'. The bookmarks may be initiated from within a web page having a piece of content or from an external button, such as a browser application or bookmarklet. The public record may be created in several different ways using the collaboration system. For example, a user may use the "email+" button (such as shown in FIG. 49) wherein a user clicks on the "email+" button and the collaboration gives them the option to make the content public. In one embodiment, the collaboration system defaults to making items/content public.

Figure 52:
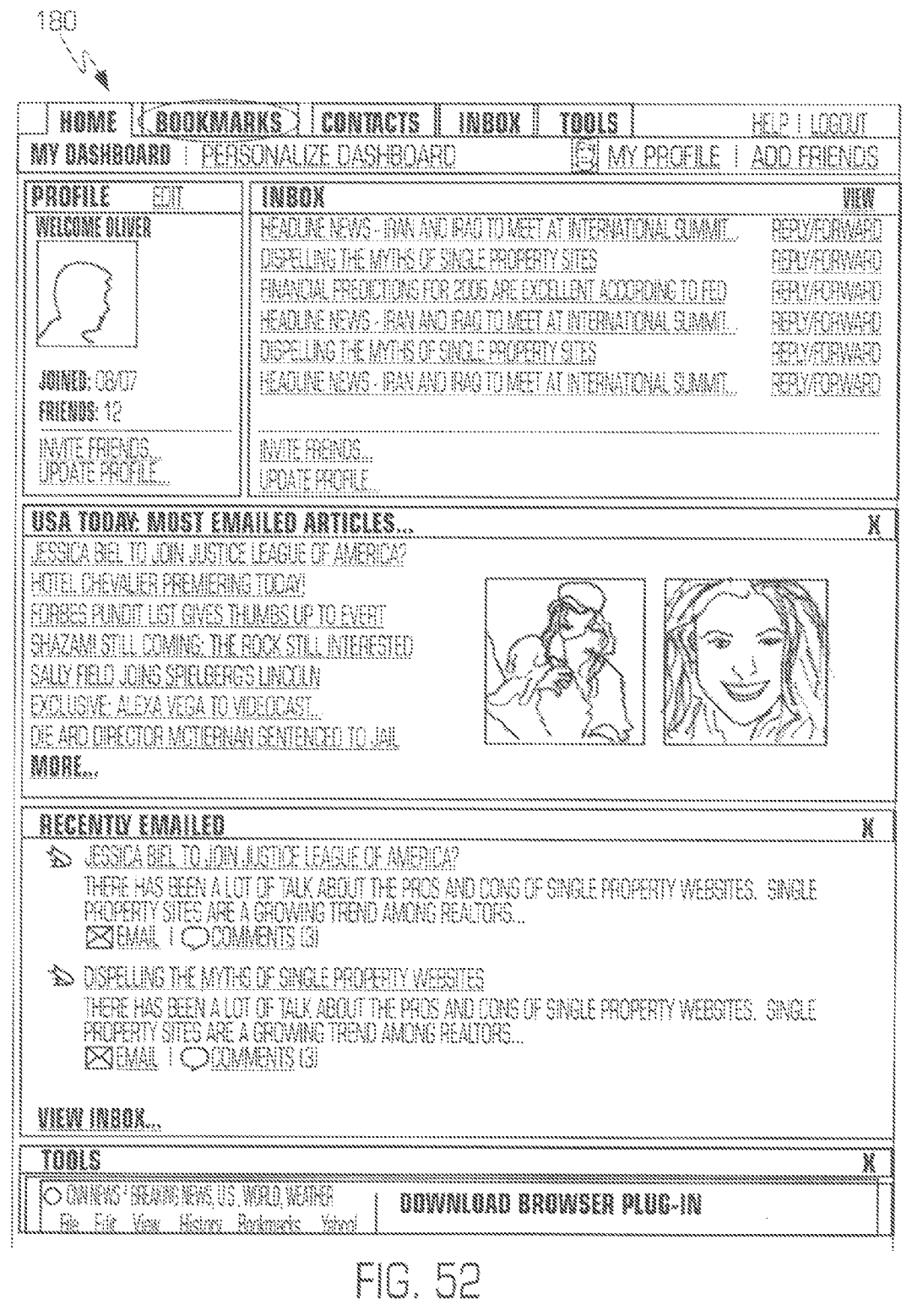

As another example, the user may create a public record using the bookmarks portion 180 of the collaboration system as shown in FIG. 52. The user can then click on the bookmark this page link from a browser and the collaboration system generates a pop up window asking the user if they want the content/item to be private or public. After the selection, the bookmark portion 180 of the collaboration system for the particular user is displayed to the user where the user can see all of the public and private bookmarks.

Therefore, the generated public record allows robots, crawlers, etc. to detect, pull and post data for others to see (publicly.) In addition, the collaboration system's public record allows other users or visitors to see what's been emailed, tagged, rated, etc.

Figure 53A:
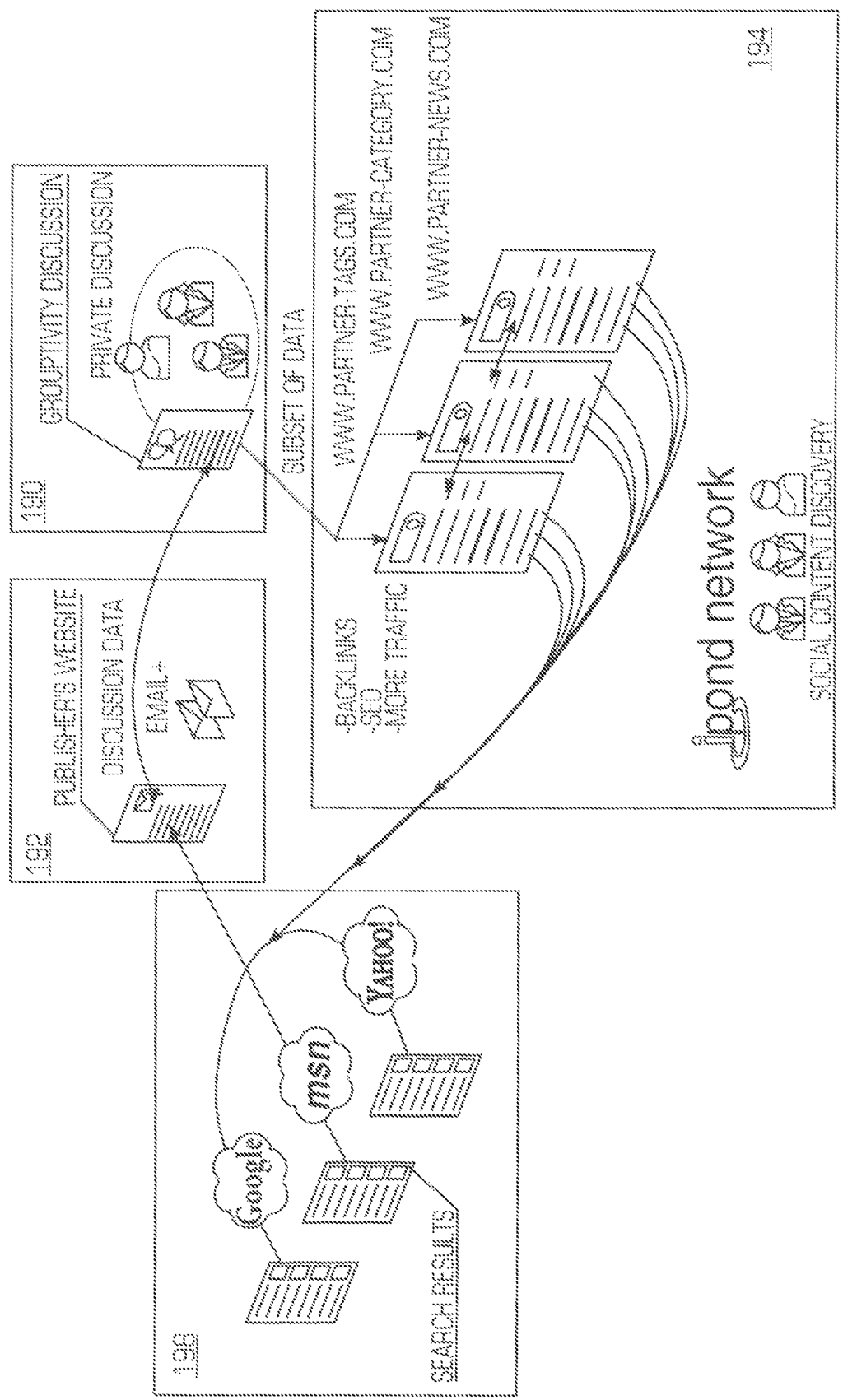
FIGS. 53A-53C illustrate the collaboration system integrated with search engines.
Figure 53B:
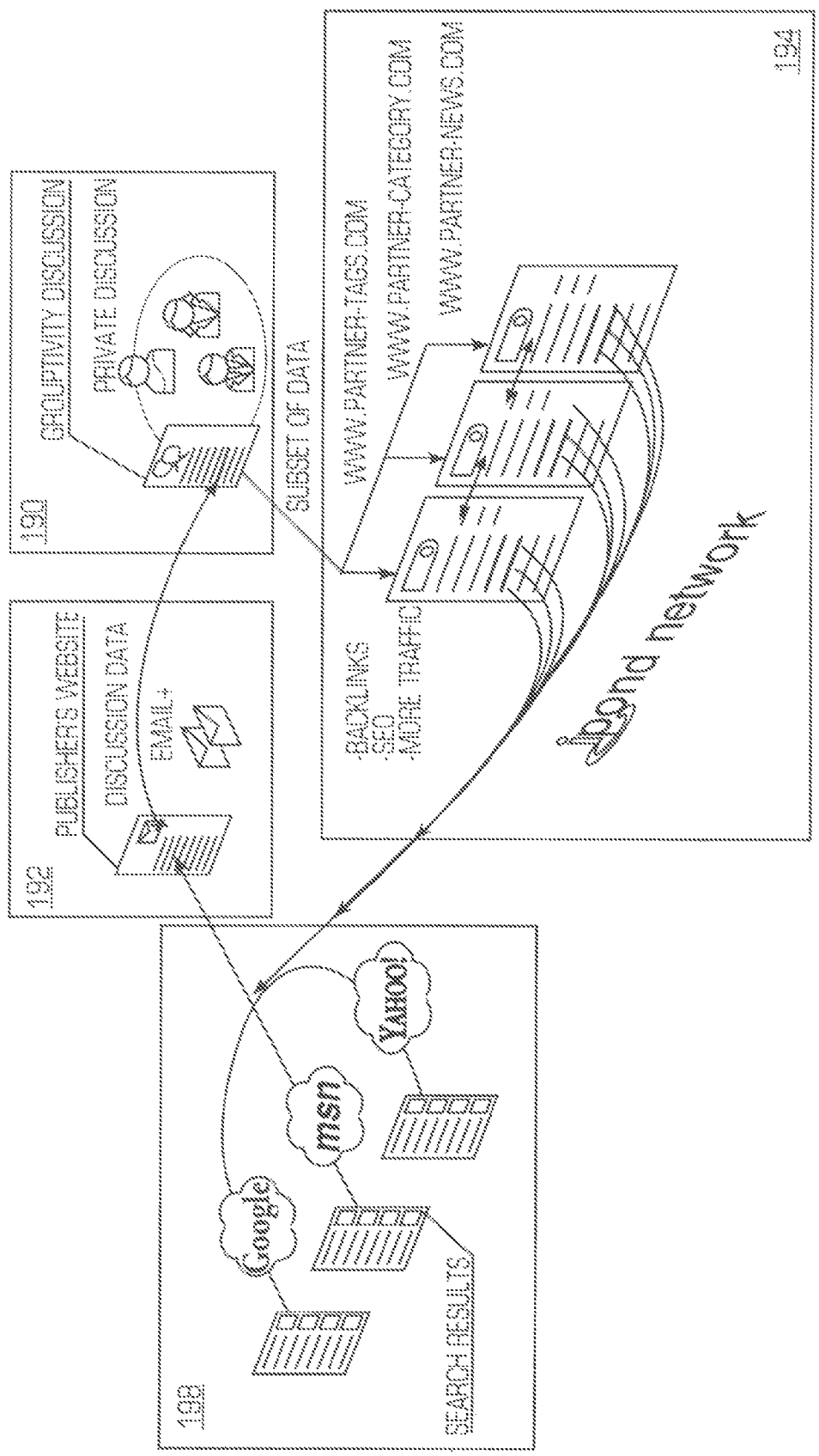
Figure 53C:
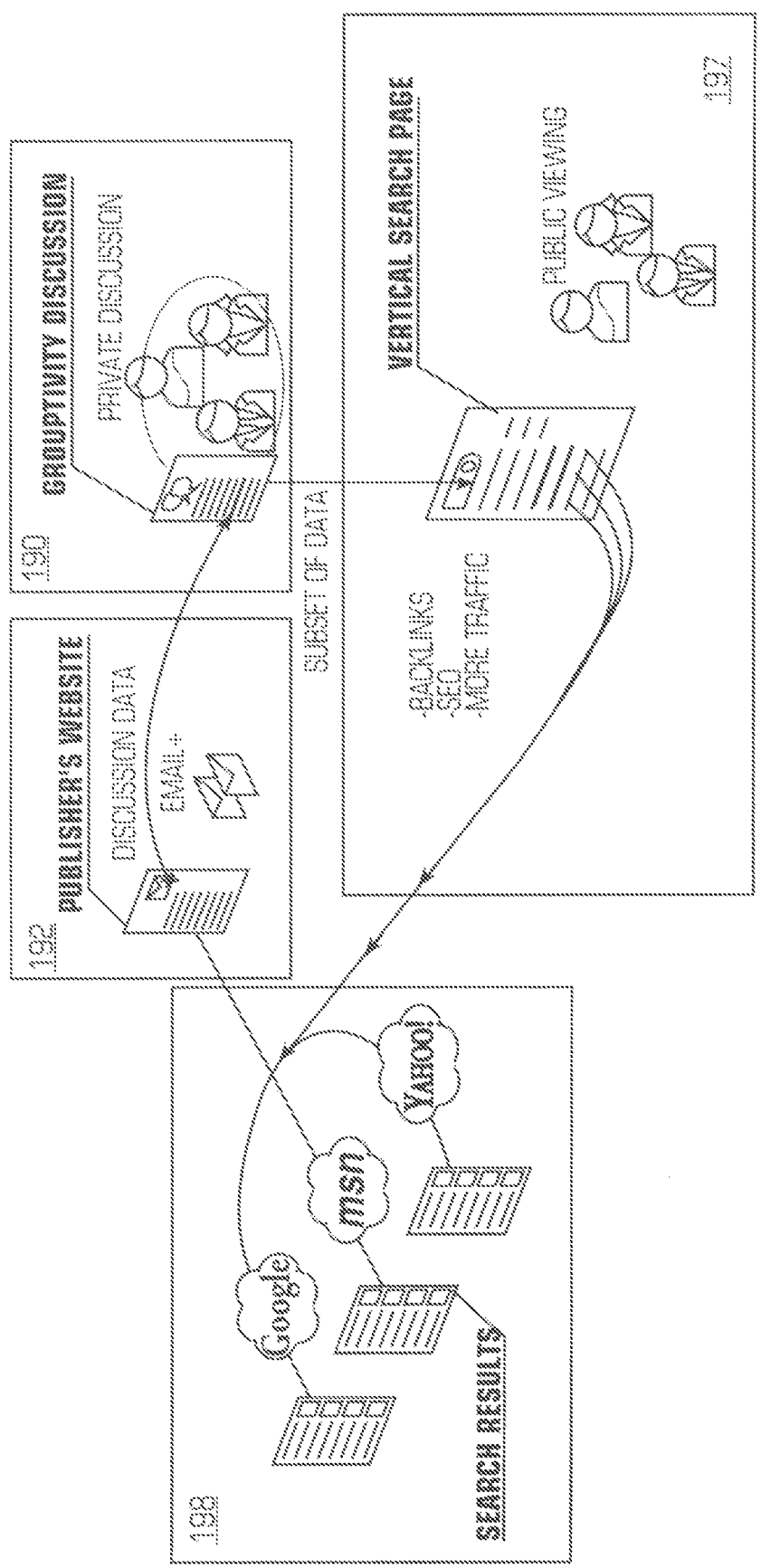

FIGS. 53A-53C illustrate the collaboration system integrated with search engines. In other words, the collaboration system provides a search engine for all 'social networks.' The collaboration system may host a private discussion 190 based on content from a publisher's website 192 using the "email+" functionality described above. The private discussion may generate discussion data and a subset of that data (which is made public as described above) is available for crawling, scraping, etc. by one or more public sites 194 (as shown in FIGS. 53A and 53B) or a vertical search page 197 (as shown in FIG. 53C). The public sites or vertical search pages may then generate more traffic, backlinks and search engine optimization (SEO) data that are sent to one or more search engines 198. The one or more search engines generate search results based on a user query and also feeds data to the publisher's website 192. Thus, the integration with search engines allows the user to search for key words in all other 'social networks' and provide an extended list for searcher.

The integration with search engines also provides the aggregation of links from sharing wherein web content can be shared via email, bookmarking, IM, etc. When a user shares some web content with others, that content is now known to be of some interest to the recipient and the sender. Thus, the sender of that content has essentially done some work in finding that content of interest and the work done can be leveraged beyond the sender and recipient due to the search engine integration when the content is placed in a public domain.

Thus, the collaboration system is aggregating all shared content into one repository that the public can search and discover what others are sharing. Each search (since there may be a plurality of searches) can be saved so that, as new content is being populated into the repository, the user request will be refreshed and delivered to the user via RSS, email, IM, SMS, etc. The content may be deposited in the repository via email+, via RSS feeds, via sending of the content to users by web content publishers, and/or by the collaboration system pulling data from other sharing sites. The collaboration system may provide access to that data using a menu format with categories and publications and users can drill down to see what is of interest or it can be provided via a free text search engine. In the collaboration system, the links and associated tags/keywords will be indexed and be searchable.

The content in the repository of the collaboration system has benefit for the publisher in their page ranking and can increase traffic to their site as shown in FIGS. 53A-C. In addition, every email will have a backlink back to the publisher. The structure of the content, meta tags, etc . . . may also be captured.

As shown in FIGS. 53A and 53B, the collaboration system may include iPond which is a system that aggregates and ranks emailed web content since the distribution/syndication of web content is an important strategy for web publishers and the internet allows publishers to drive traffic to their content site from multiple sources. iPond allows a user to post the content to a site where it can be shared/viewed by their friends and/or the general public which in turn allows the viewers to review the content that is being shared and to be directed back to the content site. This is further filtered by the content that is more often posted rises to the top of the rankings.

iPond takes advantage of a "wisdom of the crowds" principle that states that the general consensus of a group is a better indication of value than an expert in the field since a group can distill the most interesting content better than an editor. In addition, it utilizes "human filtering" which means that a human has reviewed the content which improves the search and discovery of interesting web content. iPond takes advantage of these principles along with the fact that the most common way for users to share and distribute web content it via email which does not require a learning curve and is the basis for the collaboration system and method described above. Thus, the sharing and distribution of content using the collaboration system is coupled with a search and discovery site (iPond) which provides the publisher referral traffic to their content and sub-conscious "human filtering." In the collaboration system, when a user emails a piece of content to a friend, the content is posted anonymously at iPond where it can be reviewed and ranked.

While the foregoing has been with reference to a particular embodiment of the system and method, it will be appreciated by those skilled in the art that changes in this embodiment may be made without departing from the principles and spirit of the invention, the scope of which is defined by the appended claims.

The invention claimed is:

1. A collaboration system, comprising:
an Appmail server;
a plurality of user computing devices, each user computing device having a processing unit with a browser application being executed by the processing unit, the plurality of user computing devices communicatively connected to the Appmail server over a network;
code for rendering, in a toolbar of a window of one of said user computing device browser applications, and independent of any content rendered in said window of said browser application, a button with associated functionality which, when activated, generates a discussion thread collaboration email message which includes an element of content; and
the Appmail server including an Appmail engine having a discussion thread collaboration tool and email system that, in response to activation of said button, coordinates the sharing of said discussion thread collaboration email message including the element content with at least one of said user computing devices, thereby facilitating a discussion regarding the element of content.

2. The collaboration system of claim 1, wherein said button is rendered in an email system toolbar of said browser application window, and said button is a discuss content button which, when activated, initiates functionality facilitating said user computing devices to participate in a discussion regarding said element of content using the discussion thread collaboration tool and email system.

3. The collaboration system of claim 2, wherein the browser application of a particular user computing device, in response to a request for a new discussion thread collaboration email message from the particular user computing device, displays a compose new discussion thread collaboration email message wherein an email address for said a least one user computing device is provided to the discussion thread collaboration tool and email system.

4. The collaboration system of claim 3, wherein the browser application of a particular user computing device, in response to a request for a new discussion thread collaboration email message from the particular user computing device, allows a personal note for the new discussion thread collaboration email message to be provided to said at least one user computing device.

5. The collaboration system of claim 3, wherein the browser application of a particular user computing device, in response to a request for a new discussion thread collaboration email message from the particular user computing device, allows the user of the particular user computing device to add one or more questions into the new discussion thread collaboration email message for the element of content.

6. The collaboration system of claim 1, wherein the Appmail server further comprises an address book for each user of the discussion thread collaboration tool and email system.

7. The collaboration system of claim 6, wherein the address book further comprises one or more groups of users in the address book.

8. The collaboration system of claim 1, wherein the browser application of a particular user computing device generates a display that allows the user to register with the discussion thread collaboration tool and email system and generate a new discussion thread collaboration email message for the element of content.

9. The collaboration system of claim 1, wherein the browser application of a particular user computing device for a particular one of said at least one user computer device generates a display to add a new element of content to the discussion thread collaboration email message.

10. The collaboration system of claim 1, wherein the discussion thread collaboration tool and email system allows a user of the discussion thread collaboration tool and email system to post an element of content in the discussion thread collaboration email message to a third party server.

11. The collaboration system of claim 1, wherein the discussion thread collaboration tool and email system provides a private discussion thread collaboration using a discussion thread collaboration email message.

12. The collaboration system of claim 1, wherein the discussion thread collaboration tool and email system generates a public record for the element of content in the discussion thread collaboration email message.

13. The collaboration system of claim 12, further comprising one or more search engines integrated with the discussion thread collaboration tool and email system wherein the public record is shared with the one or more search engines.

14. The collaboration system of claim 1, wherein the element of content is selected from the group consisting of: a webpage, an article and an image.

15. The collaboration system of claim 1, wherein each user computing device is selected from the group consisting of: a wireless email device, a cellular phone, a mobile phone, a personal computer and a laptop computer.

16. The collaboration system of claim 1, wherein the network is selected from the group consisting of: a wired network and a wireless network.

17. An Appmail server for communicating with and among one or more user computing devices, each user computing device having a processing unit with a browser application being executed by the processing unit, said Appmail server configured and having stored thereon instructions for coordinating communication between and among said Appmail server and said one or more user computing devices, said Appmail server comprising:
- a discussion thread receiving module for receiving an indication that one of said user computing devices has originated a discussion thread in response to a user's activation of a button associated with an element of content from within a toolbar of the browser application;
- a discussion thread collaboration tool and email system including an email message generating module for generating, in response to receiving an indication that one of said user computing devices has originated a discussion thread, a discussion thread collaboration email message which includes the element of content;
- a distribution module for facilitating the distribution, from said one of said user computing devices that has originated a discussion thread, of the discussion thread collaboration email message to one or more of the other user computing devices; and
- a message creation module providing a plurality of address, format and content options for the discussion thread collaboration email message and for displaying the discussion thread collaboration email message with the element of content in the browser application of the user computing devices of the said one of the user computing devices, for distribution by said distribution module, so that said one of the user computing devices that has originated a discussion thread and the one or more of the other user computing devices can discuss the element of content.

18. The Appmail server of claim 17 wherein said message creation module further comprises a module for generating and displaying, in response to a request for a new discussion thread collaboration email message from the particular user computing device, a compose new discussion thread collaboration email message wherein an email address for the one or more user computing devices are provided to the discussion thread collaboration tool and email system.

19. The Appmail server of claim 18 further comprising a module allowing, in response to a request for a new discussion thread collaboration email message from the particular user computing device, a personal note for the new discussion thread collaboration email message to be provided to the one or more user computing devices.

20. The Appmail server of claim 18 wherein said server is configured to allow, in response to a request for a new discussion thread collaboration email message from the particular user computing device, the user of the particular user computing device to add one or more questions into the new discussion thread collaboration email message for the element of content.

21. The Appmail server of claim 17 wherein said server is configured to allow a user to register with the discussion thread collaboration tool and email system and generate a new discussion thread collaboration email message for the element of content.

22. The Appmail server of claim 17 wherein said server is configured to allow a user of the discussion thread collaboration tool and email system to post an element of content in the discussion thread collaboration email message to a third party server.

23. The Appmail server of claim 17 wherein said server is configured to allow a private discussion thread collaboration using a discussion thread collaboration email message.

24. The Appmail server of claim 17 wherein said server is configured to generate a public record for the element of content in the discussion thread collaboration email message.

25. The Appmail server of claim 24 wherein said server is configured such that at least one search engine is integrated with the discussion thread collaboration tool and email system wherein the public record is shared with the one or more search engines.

26. The Appmail server of claim 17, wherein the element of content is selected from the group consisting of: a webpage, an article and an image.

* * * * *